US005585858A

United States Patent [19]

Harper et al.

[11] Patent Number: 5,585,858
[45] Date of Patent: Dec. 17, 1996

[54] SIMULCAST OF INTERACTIVE SIGNALS WITH A CONVENTIONAL VIDEO SIGNAL

[75] Inventors: Gregory W. Harper; Michael J. Freeman, both of New York, N.Y.

[73] Assignee: ACTV, Inc., New York, N.Y.

[21] Appl. No.: 289,499

[22] Filed: Aug. 12, 1994

Related U.S. Application Data

[63] Continuation-in-part of Ser. No. 228,355, Apr. 15, 1994.

[51] Int. Cl.$^6$ ............. H04N 7/087; H04N 7/08; H04N 7/12; H04N 7/14
[52] U.S. Cl. ............. 348/485; 348/13; 348/12; 348/10; 348/9; 348/473
[58] Field of Search ............. 348/473–486, 348/460, 461, 462, 465, 468, 552, 563, 564, 569, 589, 600, 578, 13, 12, 10, 6, 16, 121, 9; 395/155, 161, 153, 154; 455/5.1; 434/307 R, 323, 335, 350; 352/5, 6, 8, 10, 25; 364/410; 273/434; H04N 7/087, 7/08, 7/12, 7/14

[56] References Cited

U.S. PATENT DOCUMENTS

| Re. 32,776 | 11/1988 | Saylor | 358/142 |
| Re. 34,340 | 8/1993 | Freeman | 358/86 |
| 2,612,533 | 9/1952 | Homrighous . | |

(List continued on next page.)

FOREIGN PATENT DOCUMENTS

| 16314 | 10/1980 | European Pat. Off. | G09B 7/04 |
| 128481 | 12/1984 | European Pat. Off. . | |
| 4207885 | 7/1992 | Japan | H04N 7/14 |
| 6165170 | 6/1994 | Japan | H04N 7/14 |
| 8102961 | 10/1981 | WIPO | H04N 7/16 |
| 9403851 | 2/1994 | WIPO | G06F 3/00 |

OTHER PUBLICATIONS

Harless, et al., "Interactive Videodisc Case Studies for Medical Education," 10th Ann. Symp. Computer Applications in Medical Care (Oct. 1986).
Bock, "Videodisk Standards: A Software View of the Technology," 8012 S.M.P.T.E. Journal, vol. 92 (1983).

*Primary Examiner*—Safet Metjahic
*Attorney, Agent, or Firm*—Dorsey & Whitney LLP

[57] ABSTRACT

A system for simulcasting a fully interactive program with a normal conventional program in the same standard video signal bandwidth. It allows active participation by subscribers who have interactive components connected to a television or personal computer display, as well as normal viewing of the conventional program by viewers with conventional television sets. Interactive participants are not limited to any particular reception system. Users can participate using an interactive program box connected to a standard television set or with a multimedia personal computer with an interactive board. An important feature is that interactivity is offered as an option, without any degradation or interruption in program content to users who choose not to interact or do not have the interactive components. Interactivity is personalized through the use of alternative audio responses and/or graphic displays. The interactive elements are presented to the subscriber either immediately after subscriber entry, later during the program at predetermined times, and/or at transparent "trigger points". At trigger points, program content is subtly altered to present specialized attention to each interactive subscriber viewing the displayed programming. Interactive programs viewable over the simulcast system include both live broadcasts as well as recorded programs. Interactive audio and graphics elements can be provided as part of the transmitted video signal bandwidth using efficient one way techniques or from local or external storage. The interactive innovative features are not limited to conventional cable or television broadcast or any particular transmission means or transmission format, and can be analog or digital.

30 Claims, 10 Drawing Sheets

U.S. PATENT DOCUMENTS

| | | | |
|---|---|---|---|
| 2,777,901 | 1/1957 | Dostert | 179/100.2 |
| 2,826,828 | 3/1958 | Hamilton | 35/9 |
| 2,908,767 | 10/1959 | Fritzinger | 179/100.2 |
| 2,921,385 | 1/1960 | Hamilton | 35/9 |
| 3,008,000 | 11/1961 | Morchand | 348/485 |
| 3,020,360 | 2/1962 | Gratian et al. | 179/100.2 |
| 3,194,895 | 7/1965 | Treadwell | 179/100.2 |
| 3,221,098 | 11/1965 | Feldman et al. | 178/5.8 |
| 3,245,157 | 4/1966 | Laviana | 35/9 |
| 3,255,536 | 6/1966 | Livingston | 35/9 |
| 3,273,260 | 9/1966 | Walker | 35/9 |
| 3,284,923 | 11/1966 | Leslie | 35/8 |
| 3,343,280 | 9/1967 | Tolnai | 35/35 |
| 3,366,731 | 1/1968 | Wallerstein | 178/6 |
| 3,387,084 | 6/1968 | Hine et al. | 178/6.8 |
| 3,440,342 | 4/1969 | Beltrami | 178/6.8 |
| 3,477,144 | 11/1969 | Stillit | 35/9 |
| 3,484,950 | 12/1969 | Serrell et al. | 35/9 |
| 3,485,946 | 12/1969 | Jackson et al. | 178/6 |
| 3,538,621 | 11/1970 | Mayeda | 35/9 |
| 3,546,791 | 12/1970 | Koos et al. | 35/9 |
| 3,566,482 | 3/1971 | Morchand | 35/9 |
| 3,575,861 | 4/1971 | Flossmoor, III | 252/51.5 |
| 3,602,582 | 8/1971 | Torricelli | 352/40 |
| 3,623,238 | 11/1971 | Laplume et al. | 35/9 |
| 3,643,217 | 2/1972 | Morphew et al. | 340/147 P |
| 3,665,615 | 5/1972 | Laplume | 35/9 A |
| 3,708,891 | 1/1973 | Rosov | 35/9 A |
| 3,725,571 | 4/1973 | Justice | 178/5.2 R |
| 3,730,980 | 5/1973 | Kirk, Jr. | 178/5.1 |
| 3,757,225 | 9/1973 | Ulicki | 325/308 |
| 3,763,577 | 10/1973 | Goodson | 35/48 R |
| 3,774,316 | 11/1973 | Maier | 35/9 B |
| 3,814,841 | 6/1974 | Ulicki | 178/5.1 |
| 3,825,674 | 7/1974 | Justice | 178/5.6 |
| 3,833,760 | 9/1974 | Tickle | 178/6.8 |
| 3,849,594 | 11/1974 | Justice | 178/5.6 |
| 3,857,999 | 12/1974 | Justice | 178/5.6 |
| 3,860,745 | 1/1975 | Takada | 178/5.6 |
| 3,902,007 | 8/1975 | Justice | 178/5.8 R |
| 3,916,092 | 10/1975 | Justice | 178/5.6 |
| 3,936,595 | 2/1976 | Yanagimachi et al. | 348/485 |
| 3,988,528 | 10/1976 | Yanagimachi et al. | 348/485 |
| 3,991,266 | 11/1976 | Baer | 178/5.8 R |
| 4,034,990 | 7/1977 | Baer | 273/85 R |
| 4,040,088 | 8/1977 | Hannan | 358/127 |
| 4,044,380 | 8/1977 | Justice et al. | 358/142 |
| 4,078,316 | 3/1978 | Freeman | 35/8 A |
| 4,199,781 | 4/1980 | Doumit | 358/83 |
| 4,245,245 | 1/1981 | Matsumoto et al. | 358/122 |
| 4,264,924 | 4/1981 | Freeman | 358/86 |
| 4,264,925 | 4/1981 | Freeman et al. | 358/86 |
| 4,290,142 | 9/1981 | Schnee et al. | 455/3 |
| 4,292,649 | 9/1981 | Macheboeuf | 358/22 |
| 4,305,131 | 12/1981 | Best | 348/96 |
| 4,331,974 | 5/1982 | Cogswell et al. | 358/86 |
| 4,333,152 | 6/1982 | Best | 348/97 |
| 4,361,730 | 11/1982 | Barber et al. | 179/5 R |
| 4,381,522 | 4/1983 | Lambert | 358/86 |
| 4,399,329 | 8/1983 | Wharton | 179/1 GB |
| 4,422,105 | 12/1983 | Rodesch et al. | 348/552 |
| 4,439,784 | 3/1984 | Furukawa et al. | 358/86 |
| 4,445,137 | 4/1984 | Panofsky | 358/101 |
| 4,445,187 | 4/1984 | Best | 364/521 |
| 4,507,680 | 3/1985 | Freeman | 358/86 |
| 4,516,156 | 5/1985 | Fabris et al. | 358/85 |
| 4,530,008 | 7/1985 | McVoy | 358/123 |
| 4,536,791 | 8/1985 | Campbell et al. | 358/122 |
| 4,546,382 | 10/1985 | McKenna et al. | 358/84 |
| 4,555,730 | 11/1985 | Briggs | 358/142 |
| 4,569,026 | 2/1986 | Best | 364/521 |
| 4,571,640 | 2/1986 | Baer | 358/342 |
| 4,573,072 | 2/1986 | Freeman | 358/86 |
| 4,574,305 | 3/1986 | Campbell et al. | 358/86 |
| 4,591,248 | 5/1986 | Freeman | 352/133 |
| 4,599,611 | 7/1986 | Bowker et al. | 340/721 |
| 4,602,279 | 7/1986 | Freeman | 358/86 |
| 4,616,261 | 10/1986 | Crawford | 358/181 |
| 4,635,132 | 1/1987 | Nakamura | 348/552 |
| 4,644,515 | 2/1987 | Allebest et al. | 369/32 |
| 4,647,980 | 3/1987 | Steveton et al. | 358/254 |
| 4,665,431 | 5/1987 | Cooper | 358/145 |
| 4,694,490 | 9/1987 | Harvey et al. | 380/20 |
| 4,701,896 | 10/1987 | Allebest et al. | 369/32 |
| 4,704,725 | 11/1987 | Harvey et al. | 380/9 |
| 4,733,301 | 3/1988 | Wright, Jr. | 358/181 |
| 4,734,764 | 3/1988 | Pocock et al. | 358/86 |
| 4,750,036 | 6/1988 | Martinez | 358/147 |
| 4,763,317 | 8/1988 | Lehman et al. | 370/58 |
| 4,768,087 | 8/1988 | Taub et al. | 358/84 |
| 4,777,529 | 10/1988 | Schultz et al. | 358/143 |
| 4,780,757 | 10/1988 | Bryer et al. | 358/86 |
| 4,780,758 | 10/1988 | Lin et al. | 358/86 |
| 4,785,349 | 11/1988 | Keith et al. | 358/136 |
| 4,786,967 | 11/1988 | Smith, III et al. | 358/143 |
| 4,807,031 | 2/1989 | Broughton et al. | 358/142 |
| 4,816,905 | 3/1989 | Tweedy et al. | 358/86 |
| 4,821,101 | 4/1989 | Short | 358/181 |
| 4,839,743 | 6/1989 | Best et al. | 358/310 |
| 4,846,693 | 7/1989 | Baer | 434/308 |
| 4,847,690 | 7/1989 | Perkins | 348/483 |
| 4,847,698 | 7/1989 | Freeman | 358/343 |
| 4,847,699 | 7/1989 | Freeman | 358/343 |
| 4,847,700 | 7/1989 | Freeman | 358/343 |
| 4,855,827 | 8/1989 | Best | 358/143 |
| 4,862,268 | 8/1989 | Campbell et al. | 358/141 |
| 4,875,096 | 10/1989 | Baer et al. | 358/143 |
| 4,876,592 | 10/1989 | Von Kohorn | 358/84 |
| 4,884,974 | 12/1989 | DeSmet | 434/317 |
| 4,894,789 | 1/1990 | Yee | 364/521 |
| 4,905,094 | 2/1990 | Pocock et al. | 358/342 |
| 4,918,516 | 4/1990 | Freeman | 358/86 |
| 4,924,303 | 5/1990 | Brandon et al. | 358/86 |
| 4,926,255 | 5/1990 | Von Kohorn | 358/84 |
| 4,930,019 | 5/1990 | Chu | 358/335 |
| 4,941,040 | 7/1990 | Pocock et al. | 358/86 |
| 4,949,170 | 8/1990 | Yanagidaira et al. | 358/86 |
| 4,965,825 | 10/1990 | Harvey et al. | 380/9 |
| 4,975,771 | 12/1990 | Kassatly | 358/146 |
| 4,987,486 | 1/1991 | Johnson et al. | 358/86 |
| 4,988,111 | 1/1991 | Gerlizt et al. | 273/310 |
| 4,989,233 | 1/1991 | Schakowsky et al. | 379/92 |
| 4,989,234 | 1/1991 | Schakowsky et al. | 379/92 |
| 4,991,011 | 2/1991 | Johnson et al. | 358/141 |
| 4,994,908 | 2/1991 | Kuban et al. | 358/86 |
| 5,001,554 | 3/1991 | Johnson et al. | 358/86 |
| 5,010,400 | 4/1991 | Oto | 358/86 |
| 5,010,500 | 4/1991 | Makkuni et al. | 395/155 |
| 5,014,125 | 5/1991 | Pocock et al. | 358/86 |
| 5,023,707 | 6/1991 | Briggs | 358/343 |
| 5,034,807 | 7/1991 | Von Kohorn | 358/84 |
| 5,051,822 | 9/1991 | Rhoades | 358/86 |
| 5,053,883 | 10/1991 | Johnson | 358/349 |
| 5,055,924 | 10/1991 | Skutta | 358/84 |
| 5,057,915 | 10/1991 | Von Kohorn | 358/84 |
| 5,077,607 | 12/1991 | Johnson et al. | 358/86 |
| 5,090,708 | 2/1992 | Gerlitz et al. | 273/310 |
| 5,093,718 | 3/1992 | Hoarty et al. | 358/84 |
| 5,109,414 | 4/1992 | Harvey et al. | 380/9 |
| 5,132,992 | 7/1992 | Yurt et al. | 375/122 |
| 5,133,079 | 7/1992 | Ballantyne et al. | 455/4.1 |
| 5,157,491 | 10/1992 | Kassatly | 358/146 |

| | | | | | | |
|---|---|---|---|---|---|---|
| 5,174,759 | 12/1992 | Preston et al. | 434/317 | 5,220,420 | 6/1993 | Hoarty et al. | 358/86 |
| 5,176,520 | 1/1993 | Hamilton | 434/350 | 5,227,874 | 7/1993 | Von Kohorn | 358/84 |
| 5,177,604 | 1/1993 | Martinez | 358/86 | 5,236,199 | 8/1993 | Thompson, Jr. | 273/439 |
| 5,181,107 | 1/1993 | Rhoades | 358/86 | 5,247,347 | 9/1993 | Litteral et al. | 358/85 |
| 5,210,611 | 5/1993 | Yee et al. | 358/191.1 | 5,318,450 | 6/1994 | Carver | 434/336 |

SIMULCAST OF INTERACTIVE SIGNALS WITH A CONVENTIONAL VIDEO SIGNAL

RELATED APPLICATIONS

This is a continuation-in-part of application Ser. No. 08/798,355, filed Apr. 15, 1994, entitled "A DISTANCE LEARNING SYSTEM PROVIDING INDIVIDUAL TELEVISION PARTICIPATION, AUDIO RESPONSES, AND MEMORY FOR EVERY STUDENT." The interactive television program is of a type disclosed in commonly copending U.S. patent application Ser. No. 07/797,298, filed Nov. 25, 1991, and in U.S. Pat. Nos. 4,847,700, 4,507,680, 4,573,072, 4,602,279, 4,264,925, and 4,264,924, the contents of which are herein incorporated by reference.

BACKGROUND OF THE INVENTION

Interactive television system technologies are currently being introduced into the telecommunications scene. These technologies are being applied primarily to provide entertainment and educational opportunities to the television industry. Interactive capability has been developed using one-way systems through the provision of multiple parallel channels of information, related in content to one another. For example, commonly owned Freeman et al. patents, U.S. Pat. Nos. 4,264,924 and 4,264,925, disclose interactive television systems where switching among multiple broadcast or cable channels based on viewer selections in response to interrogatory messages allows an interactive capability.

These systems have been enhanced to include memory functions using computer logic and memory, where selection of system responses played to the viewer are based on the processing and storage of subscriber responses, as disclosed in Freeman patent, U.S. Pat. No. 4,507,680.

The benefits of providing interactivity through the use of different audio responses was disclosed in Freeman, U.S. Pat. Nos. 4,847,698, 4,847,699, and 4,847,700. These television systems provide a common video signal accompanied by several synchronized audio channels to provide content related user selectable responses. The audio signals produce different audio responses, and in some cases, these are syllable synched to a first audio script and to the video signal (such as to a person or character on the display) providing the perception that the person's or character's mouth movements matched the spoken words.

These prior art systems generally provided interactive capability through the use of several parallel related information segments, each segment requiring a separate channel. What is needed is a fully functional interactive program which can be normally received by noninteractive television receivers as a conventional video broadcast. What is needed is a system not limited to receiving multiple parallel tracks of audio transmitted simultaneously. What is needed is an interactive system where interactivity is not restricted to a question and answer format. Because channel capacity is limited in most transmission systems today, what is needed is a system where full interactivity is provided in the same bandwidth as currently required by a standard television signal. What is needed is a system that individualizes the interactive experience through personalized graphics video overlay and personalized audio channels. What is needed is a system for providing a fully interactive capability to every home, regardless of transmission media. What is needed is a system for simulcasting both conventional television programming and a full interactive program, all within the same signal.

SUMMARY OF THE INVENTION

The present invention can allow each subscriber to a program received in the home, to receive an individualized and personalized experience. A truly innovative aspect of this invention is the simulcast of a fully interactive program allowing participation by subscribers through the use of an interactive program box, and yet viewers without the interactive program box can view uninterrupted normal conventional programming. Both programs are provided by reception of the same standard video signal of normal conventional programming. This dual functionality can be provided by any one of several possible bandwidth efficient one-way techniques for sending hidden multiple interactive audio segments, graphics data and programming control data, the reception and processing of which provides a fully interactive experience for subscribers. Increased interactive flexibility is possible through the use of external data storage such as CD ROM which can store additional audio and graphics interactive elements locally. An important feature of this new invention is that interactivity is offered as an option, without any degradation or interruption in program content to users who choose not to interact or do not have the interactive program box.

By creating this more intimate relationship between the viewer and conventional programs, a novel, exciting kind of television programming is created. Yet viewing of conventional programs is not affected. Individualization to each subscriber comes not only from the personalization of audio responses and the memory capability of the system but video graphics overlays are also personalized further enhancing the interactive experience. Furthermore, interactive programming costs are dramatically reduced since fully functional interactive elements can now be carried on normal everyday television program broadcasts.

The interactive innovative features of the present invention can be provided to participants either with an interactive program box connected to a conventional television set or to computer users by way of a multimedia personal computer (PC) with an RF demodulator board and decoding hardware and software.

With the present invention, interactivity is personalized preferably through the use of alternative audio responses and graphics displays, which are presented as a function of either a current subscriber remote entry or earlier stored subscriber remote entries using the memory capability of the system where the system remembers earlier subscriber responses and uses these responses in formulating and presenting individualized audio and graphics messages to the subscriber. Personalization of audio can be enhanced through the use of preloaded additional audio response segments in the interactive program box and stacked audio response segments in time. Further enhancement is possible through the use of external data storage devices such as CD ROM for storing interactive audio and graphics elements, increasing the responsive capacities of the system of the present invention.

Unlike previously disclosed interactive systems, the present invention no longer solely requires that personalized messages be presented immediately after the subscriber has made an answer choice selection. The novel use of trigger points overcomes the limitation of the question-interactive answer response formats described in previous patents and applications by allowing for specialized attention to be provided to the subscriber at unknown times throughout the program. Interactive audio and graphics can show up anytime during the program as a function of stored subscriber information.

This enhanced interactivity is provided through the use of trigger points spread throughout the program and identifiable by codes embedded into the video signal. Trigger points provide designated times during the program when the program content is subtlely altered to present individual and specialized attention to the particular subscriber viewing the television or computer screen. The trigger points are essentially markers on the program that effectively trigger macros which call for a certain interactive function (e.g., the playing of a personalized audio segment and/or the overlay of a graphics screen) to occur using stored subscriber selections to questions presented preferably at the beginning of the show, or retained from a previous show, and/or in combination with a particular pattern of interactions solicited and entered during the program. The interactive program box controller recognizes the trigger points by decoding invisible codes embedded in the conventional video signal. The exact timing of the trigger points are unknown to the subscriber in order to make the interactive elements appear unsolicited to the interactive subscriber. In this manner, the interactive elements are presented in a more subtle and less noticeable fashion thereby increasing significantly the personalized experience to home viewers.

Meanwhile, subscribers either without the interactive program boxes or with the box but not authorized to receive the particular interactive program continue to receive and hear the standard program audio and view the conventional video without being offered interactive choices and specialized responses. Therefore, both an interactive program and a noninteractive program are being simultaneously transmitted to subscribers.

This high degree of individual participant interactivity is provided to the home television or personal computer through the use of only one standard video signal. A normal television signal has an audio carrier and a video carrier. Standard audio, synchronized to the video presentation, is inserted into the normal audio carrier, thereby maintaining compatibility with any conventional television set. In the present invention, unused lines of the video are preferably used for embedding additional interactive response audio channels and graphics and control data. Alternatively, the interactive audio segments could be provided either serially, one after another, in the audio subcarrier (SAP), or in cable frequency guard bands, and/or prestored in memory at the interactive program box. In addition, even more audio and graphics elements can be provided through the use of external storage devices or game cartridges. In any event, with the present invention it is inconsequential whether the interactive elements are broadcast synchronously, serially, on separate channels, embedded in the video, transmitted during or before the program, stored in external data storage, etc. Any of these elements, no matter where they come from, are called up by the interactive box at designated trigger points through the use of overlaid logic sent down in embedded codes in the signal or resident in software at the receiver location. In effect, a normal conventional television program and an interactive program are broadcast simultaneously from a centralized location to a multitude of subscriber homes, some of which are equipped to receive the interactive program while others are not.

The enhanced level of interactivity is provided to interactive subscribers in their homes through the use of interactive program boxes connected to television sets, which receive signals either through cable, direct broadcast satellite, television broadcast, or other transmission means. In the present invention, the programming can be provided in both analog and digital embodiments.

It is the object of the current invention to simulcast an interactive television program and a conventional television program, all as part of one standard video signal to each of a multitude of subscribing interactive participants.

It is an object of the invention to present interactive elements throughout the program at times unknown to the subscriber.

It is an object of the invention to deliver instantaneously personalized messages to subscribers in their homes through the presentation of personalized audio responses and graphics.

It is an object of the invention to use an analog transmission means for sending multiple interactive audio signals and data codes with a single video signal.

It is an object of the invention to use digital transmission technology for combining multiple interactive audio signals, a video signal and data codes onto a single composite digital interactive video signal.

It is an object of the invention to remember earlier subscriber selections in tailoring personalized graphics and audio responses.

It is an object of the current invention to provide a dual function program; a program that is conventional and can be viewed on conventional television receiving equipment and also, allow for this same program to be received interactively once subscribers have the interactive program box.

It is an object of the current invention to recall interactive audio and/or graphics elements from an external storage device.

It is an object of the current invention to create an interactive television system that can provide demographic information to a head-end location to be used for survey purposes or for the creation of targeted commercials.

These and other advantages, features and objectives of the invention and the manner of attaining them will become apparent and the invention will be best understood by reference to the following description of the embodiments of the invention in conjunction with the accompanying drawings and appended claims.

DETAILED DESCRIPTION OF THE PREFERRED EMBODIMENT

I. Introduction

Figure 1:
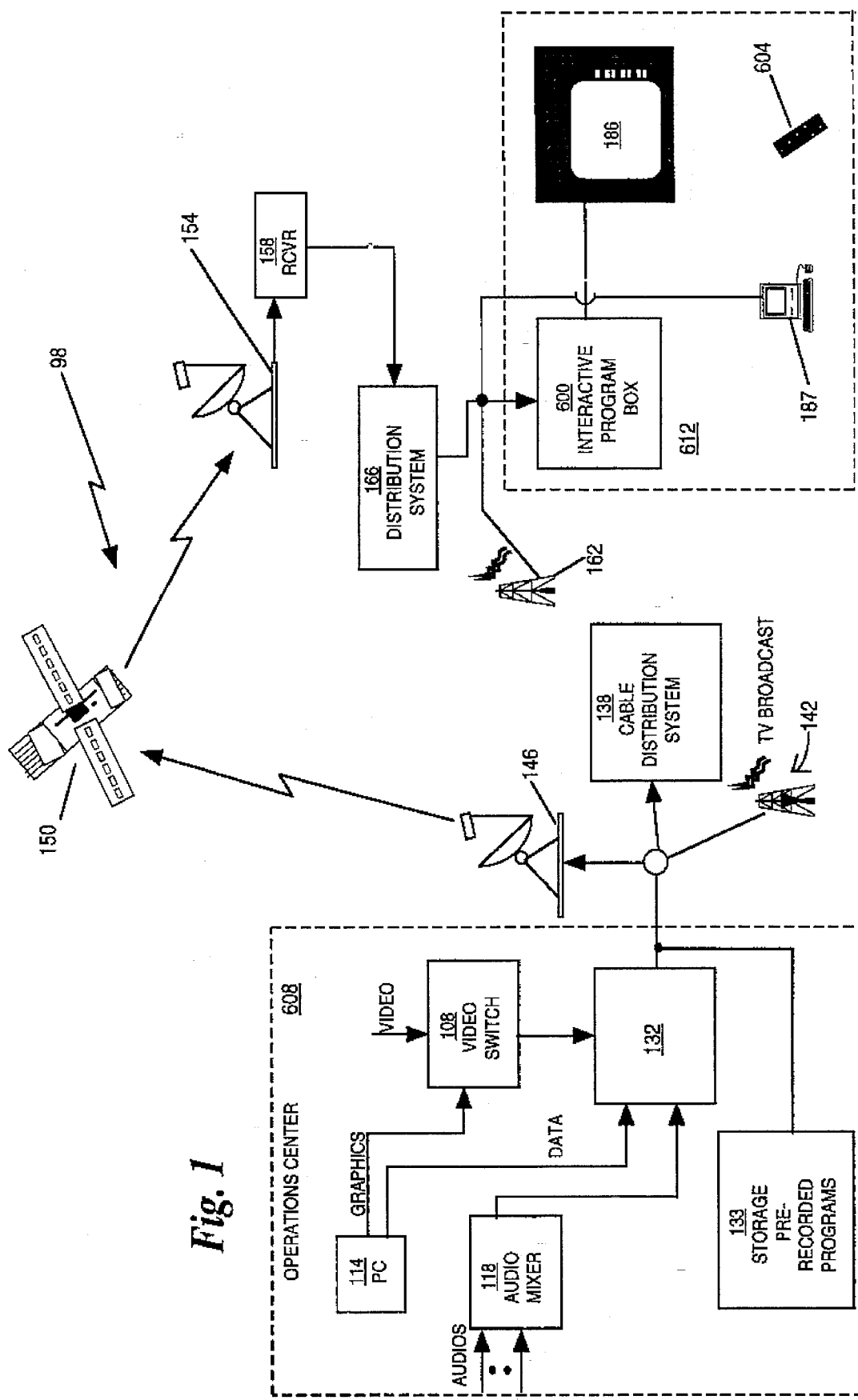
FIG. 1 is an overview of the operations center, transmission subsystem and home reception subsystem of the conventional video system.

The present invention is a system for simulcastlug a fully interactive program allowing subscribers to interact with the program through the use of a remote device 604 and an interactive program box 600 connected to a conventional television set 186 or through the use of a keypad and personal computer 187, with normal conventional programming, viewable by anybody with a regular television set 186 or computer display monitor 187, as shown in FIG. 1.

While such interactive programming may include a plurality of video signals, the interactive television programming used herein preferably comprises a single standard video and audio television signal with a plurality of additional audio signals and/or graphics data for providing interactivity. The interaction with the subscribers comes primarily by way of selection of one or more linked audio segments from a plurality of audio segments, whereby the selected audio segment(s) are chosen as a function of previous user responses. Interactivity is enhanced through the use of overlaid graphics displays on the video which like the audio responses, also vary according to selections made by the subscriber on the remote device 604. Audio segments are used to provide personalized responses to subscriber selections. The graphics, on the other hand, are used to both query the subscriber, preferably at the beginning of the program, and also to provide personalized graphical messages to subscribers. The interactive television program also comprises control data for controlling an interactive program box controller 178 at the subscriber home.

Interactivity is further enhanced in the preferred embodiment through the application of trigger points scattered at various predetermined times throughout the program. The trigger points correspond to times when interactive events are scheduled to take place. These interactive events could be the selection and playing of audio segments or the display of graphics. While the choice of particular audio segments or graphics is still dependent on viewer selections, the viewer selections in response to displayed graphical interrogatory messages are preferably made during a period at the onset of the program or when a viewer first tunes into the program. These viewer selections are then utilized as inputs to macros called up at later times during the program by the controller upon the occurrence of the trigger points, identified to the interactive program box by unique codes embedded in the video signal. Alternatively, there can be an immediate response from local storage such as RAM, FLASH or ROM, external data storage such as CD-ROM, from the composite interactive signal or from a series of audio segments that can be collected from both the signal and storage.

II. System Components

A. General Overview

As shown in FIG. 1, the system uses an interactive program delivery system 98 with any broadcast transmission means including satellite 150, cable 138 or television 142 to deliver the simulcast interactive and conventional program (hereinafter "composite interactive program") from a centralized location, or operations center 608, for distribution to subscribers in their homes. The program may be broadcast live from the operations center 608. For example, live sporting events with added interactive elements can be broadcast from the operations center 608. However, it is more likely with the present invention that the program will be produced off-line and stored in a program storage means 133 at the operations center 608. Likewise, distribution of the signal at the receive end can be by any suitable transmission means 166 including a cable distribution system, fiber optic, microwave, etc. In the preferred embodiment, the system generally includes: an operations center 608 where the composite interactive program is broadcast, the composite interactive program comprising a single video signal, a plurality of audio channels, graphics and control codes; a broadcast transmission system comprising transmission equipment for transmitting the interactive video signal by any suitable broadcast transmission means and receive equipment for distribution to the remote home locations; and at the subscriber home; an interactive program box 600 for processing the signals and providing for the interactivity; a remote device 604 for transmitting to the interactive program box 600 subscriber selections; and a standard television set 186. Alternatively, the interactive program signal can be received, processed and displayed by way of a multimedia personal computer 187 comprising an RF demodulator board, an extractor board, and keypad.

A major aspect of this invention is the individualization of audio response to subscribers in the home. Each participant receives personalized audio responses based on one or more selections on a remote 604 keypad. Since the system can remember earlier subscriber selections, the subscriber selections may be input and stored in memory at the beginning of the program and used later by the interactive program box 600 in formulating an interactive response. The audio response is normally a prepared prerecorded audio response comprising one or more audio segments. In the present invention, not only do the audio responses provide interactivity, but the graphics displays also can vary as a function of previous user selections thus generating more individualization of the program.

At the remote sites, participants interact with the interactive program either via a subscriber interface 604 or computer keypad. Preferably, the subscriber interface 604 is an Infrared (IR) datalink remote device with a keypad or if the interactive program is received by a personal computer 187, a PC keypad. Depressing a button on the keypad 604 provides input to the interactive program box processor 178 which can either immediately or later be used by the controller to trigger unique algorithmic codes to produce a unique and individual message from a plurality of transmitted audio segments and/or those prestored at the interactive program box 600. The response can be directed to the subscriber's current answer selection to an interrogatory message displayed on the screen, or may be based on earlier entered subscriber selections through the provision of memory and logic in the system and trigger points, as described below.

Multiple audio segments forming the set of suitable responses to an interrogatory message are preferably sent as part of a standard video signal. There are a number of different ways to effectively forward the necessary audio segments for a given interactive event to the interactive program box 600. Different embodiments for delivering these audio segments include digital and analog transmission embodiments including serial or parallel paths, as described below. The interactive elements may be broadcast synchronously (alternative responses aligned in time), serially, on separate channels, embedded in the existing video and/or transmitted before or during the program. Audio segments tagged for a given interactive event, can be sent to the interactive program boxes 600 much earlier than the scheduled event during the program, in which case the segments are preferably stored in temporary memory, or the segments can be transmitted concurrently with the event. With the present invention, it makes no difference how the audio segments reach the interactive program box 600 as long as they are available for selection at the box 600 at the predetermined trigger points. For example, the audio segments could also be stored in local external data storage 629 such as CD-ROM.

Figure 2:
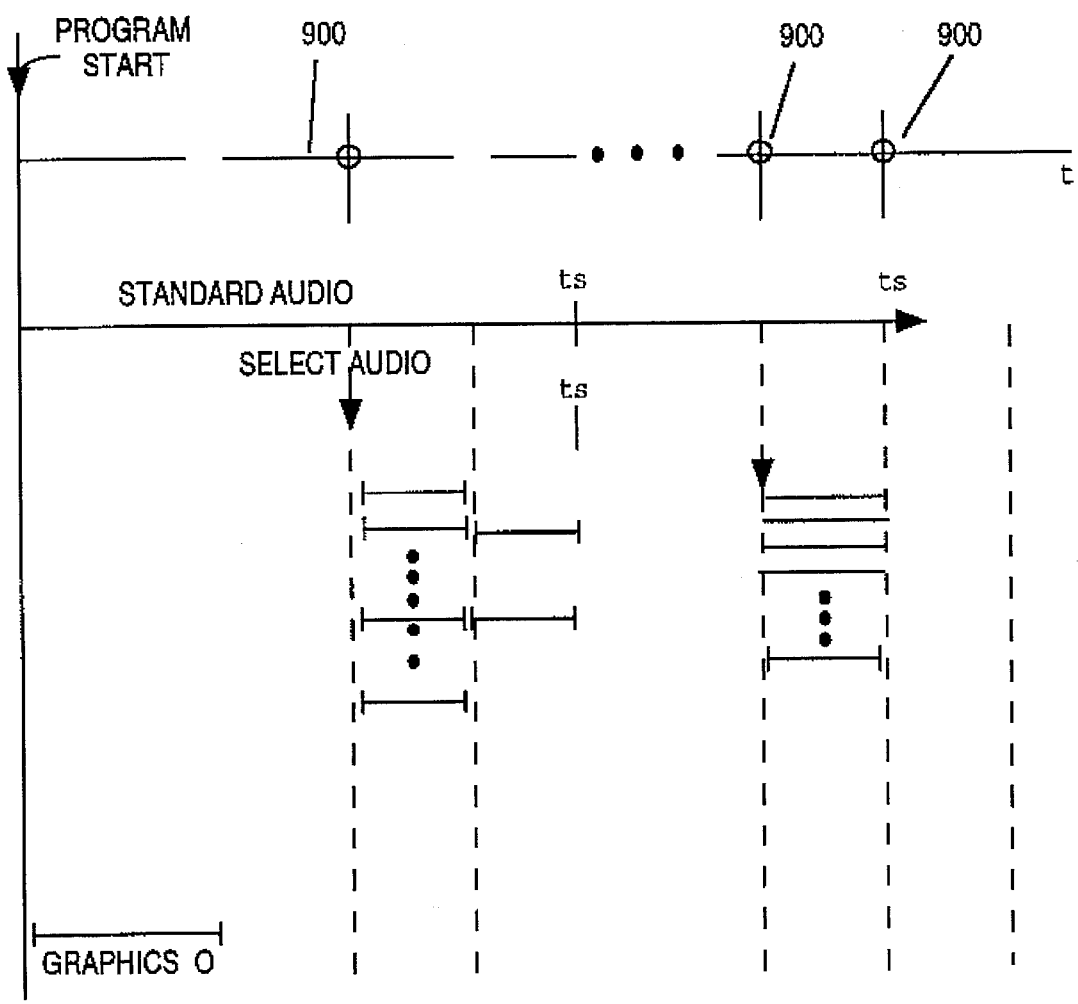
FIG. 2 is a time diagram showing a representation of trigger points and corresponding alternative audio segments, one of which is selected for presentation to the subscriber immediately after the execution of a trigger point function.

In the preferred embodiment, interactive events occur at scheduled predetermined trigger points 900, as shown in FIG. 2. These points 900 correspond to the times when the conventional program content can be altered and personalized for those subscribers capable of receiving the interactive signal. The programmer can place the trigger points 900 at any time throughout the program. Since the trigger points 900 are unknown to the subscriber, the subscriber does not know when they will receive a personalized message. In other words, an interactive response can either immediately follow a corresponding user selection made to an interrogatory message or occur at a later time corresponding to a trigger point 900, or any combination of the two. Of course, timing of the interactive events should correspond to suitable times in the program where branching to interactive elements is sensible and does not clash with the program content of the conventional video still displayed on the television 186 or other display monitor.

As shown in FIG. 2, at the onset of a trigger point 900, the controller will select one of several possible audio (or graphic display) responses for presentation to the subscriber. As mentioned above and shown in FIG. 2, some of the audio responses may comprise the linking of two or more audio segments.

In combination with the use of trigger points 900, the present invention allows for the viewer to select certain options at the onset of the program to suit the viewers' preferences. For example, if the program broadcast is a live sports event, at an early trigger point 900, the viewer could be queried as to whether the viewer would prefer to receive audio in English, Spanish, French, or perhaps hear the local announcer instead of the network announcer. Upon the viewer selection, the controller branches to the appropriate channel.

Each trigger point 900 is identified preferably through the broadcast of codes sent as part of the composite interactive program signal. The codes preferably include, at a minimum, the following information: (1) header identifying the occurrence of a trigger point; (2) function ID (e.g., selection of audio responses or graphics responses, etc.); and (3) corresponding interrogatory message(s). The first bit sequence simply identifies to the controller 178 that a trigger point is about to occur. The function ID designates the macro or other set of executable instructions for the controller 178 to read and interpret to obtain the desired result, e.g., a selected audio response. Alternatively, the data codes could include the actual algorithmic function for the controller 178 to apply.

Upon extraction of the codes by the extractor 174, the controller 178 reads and interprets the codes and calls from memory 282, 286 either a stored message for display on the screen or a particular user selection(s) designated by the trigger point codes. The user selections correspond to subscriber answers to a series of interrogatory messages preferably presented at the beginning of the program. After obtaining the appropriate user selection(s), the controller 178 reads and performs the executable instructions using the user selection(s) as input(s) in the macro algorithm. The result of the algorithm is either a selected audio response and/or selected graphics response. The audio response can be called from memory if it is prestored, called from external data storage 629, or the controller 178 can command the switch 620 to branch to the particular audio channel if the response is broadcast concurrently with the trigger point. After the selected audio response is played to the subscriber, the switch 620 branches back to the standard audio, shown at time $t_s$ in FIG. 2.

As mentioned above, a series of interrogatory messages are preferably presented when the subscriber begins watching the interactive program. These interrogatory messages can be presented in any one of three ways. First, the interrogatory messages can be presented as graphics displays overlaid by the interactive program box 600 onto the conventional video signal, wherein the graphics data is sent in the vertical blanking interval of the composite interactive signal. Second, the interrogatory messages are presented as graphics displays as discussed above, except the graphics data comes from local storage such as RAM 282 or FLASH ROM 286, external data storage 629 (e.g., CD ROM, cartridge, etc.), or a combination of data in the VBI and data called from either local 284 or external data storage 629. Third, graphics data can be presented in the form of user templates stored at the interactive program box 600.

User selections corresponding to answers to the n successive interrogatory messages are received by the remote interface 628 at the beginning of the show, stored in memory and used throughout the show at the appropriate trigger points to subtlely change program content as the show progresses. Preferably, each interrogatory has a set of possible answers. Next to each possible answer will be some identifier corresponding to a label on a key on the subscribers remote 604. The subscriber depresses the key corresponding to their answer selection. This selection is decoded by the remote interface 628 and controller 178, stored in memory 282, 286, preferably RAM 282, and used later as required by an algorithm designated at a trigger point.

Graphics can be overlaid onto the video at the subscriber site through the use of a character generator 624, as shown in FIGS. 3 and 6–8. The character generator 624 is essentially an on screen display chip. After embedding the graphics codes into the program video signal, the microprocessor 178 interprets the codes and maps the codes into the actual bit maps, representing the characters, stored in memory 282,286. The interactive program box processor 178 then commands the character generator 624 to overlay a particular character designation at a particular point in the screen.

Alternatively, graphics video can be sent from the operations center 608. The graphics video can be created and output from a personal computer 114 to a video mixer 108, as described in Harper et al.'s U.S. patent application Ser. No. 08/228,355. Referring to FIG. 1, additional inputs to the video mixer 108 may include the conventional video from either live cameras or VCR. The video mixer 108 outputs a single video signal by switching between the graphics video and program video at appropriate times.

A plurality of graphics overlays, each of which preferably comprises an interrogatory message and which are chosen as a function of previous subscriber selections in response to previous interrogatories, can be provided. The method by which a graphics message is chosen is substantially the same as the method used to select audio responses. The graphics overlays can be selected as interactive responses at trigger points as explained in the preceding paragraphs. As with the audio responses, one of several possible graphics overlays can be presented during any given time interval. The graphics message chosen is also based on the subscriber selections to displayed interrogatory messages at the beginning of the program. The subscriber selections are called by the interactive program box processor 178 which examines these inputs according to algorithmic codes to produce the next graphics interrogatory message.

The one-way interactive system also has the advantage of remembering subscriber responses and using these responses in choosing an audio response, and/or graphics interrogatory message, to present to the student. Memory branching is a technique of the present invention where the algorithm assembles audio responses and graphics interrogatory messages according to the current and previous user inputs. Memory branching is accomplished by linking audio message segments or successive graphics interrogatory messages together in a logical relationship. In this scheme, the interactive program box processor 178 contains logic (preferably, in the software algorithm) and memory 284 to store previous subscriber selections and to process these previous responses in the algorithm to control future audio channel selection, as well as future graphics message selection.

B. The Interactive Program Box

Figure 3:
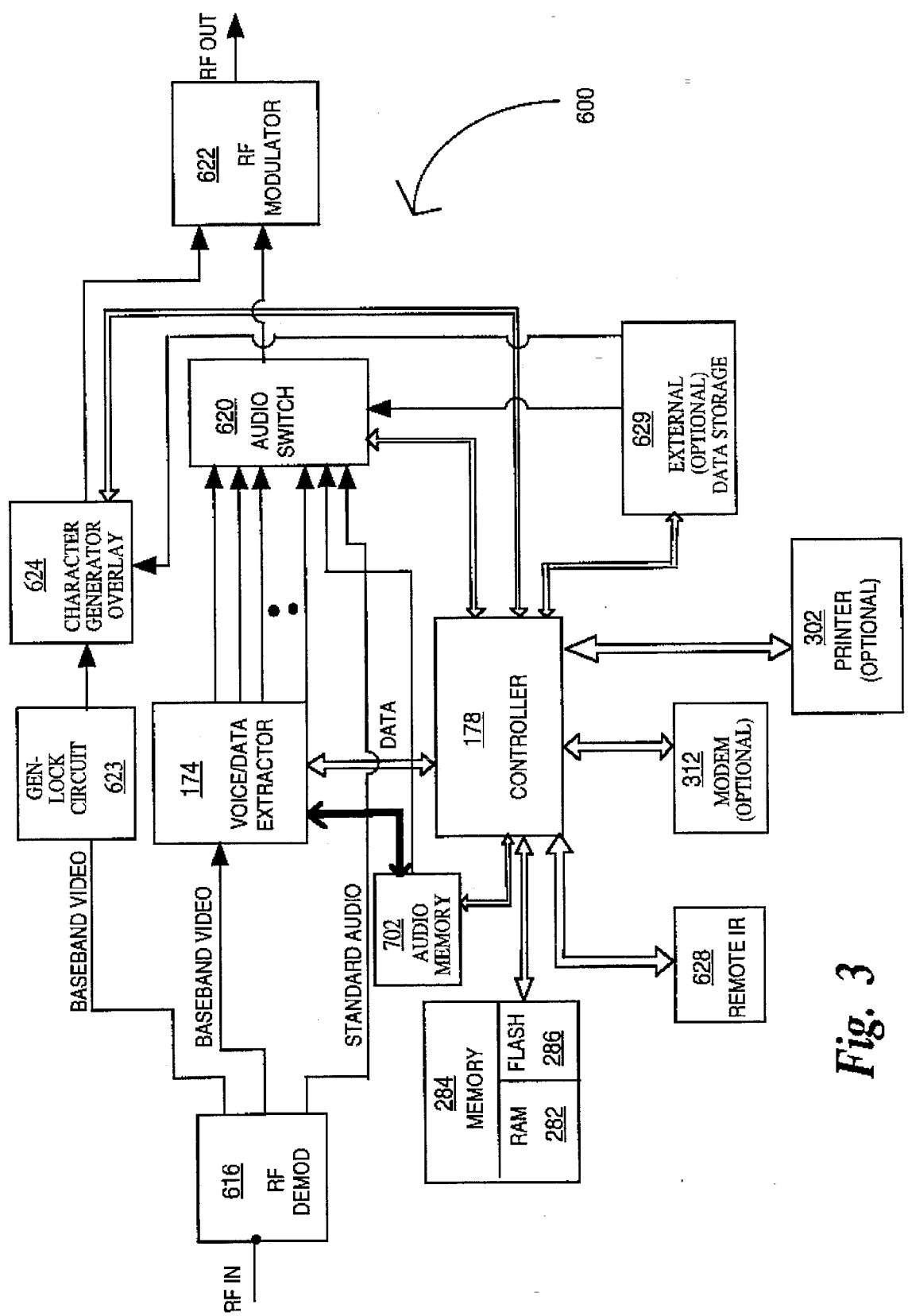
FIG. 3 is a diagram of the preferred embodiment of the interactive programming box for extracting the interactive audio segments and data from the conventional video signal bandwidth where such interactive elements have been embedded into the composite interactive video signal at the operations center.
Figure 4:
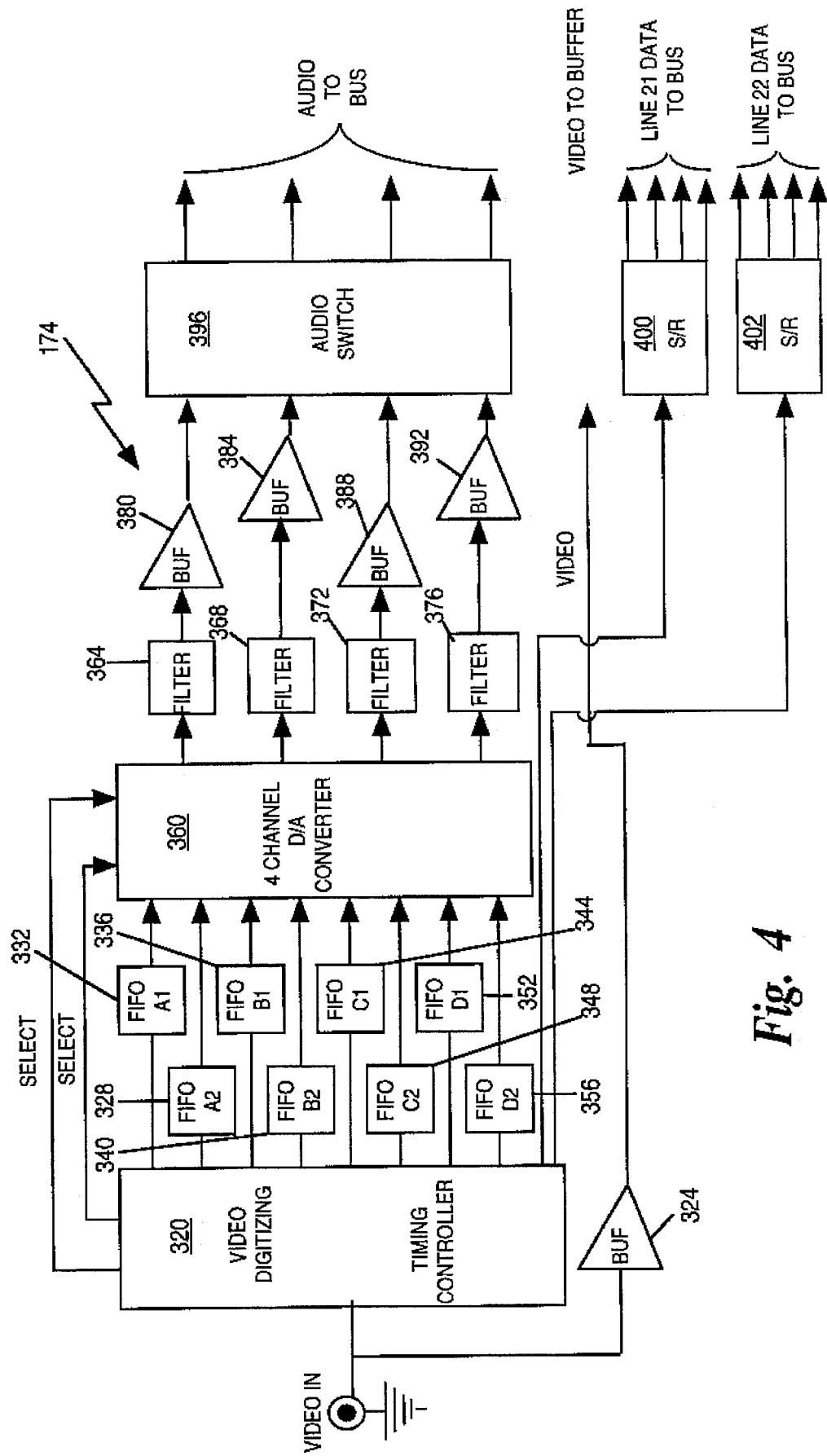
FIG. 4 is a more detailed schematic of the hardware elements of an analog four-channel VBI extractor in the interactive program box as diagrammed in FIG. 3.
Figure 5:
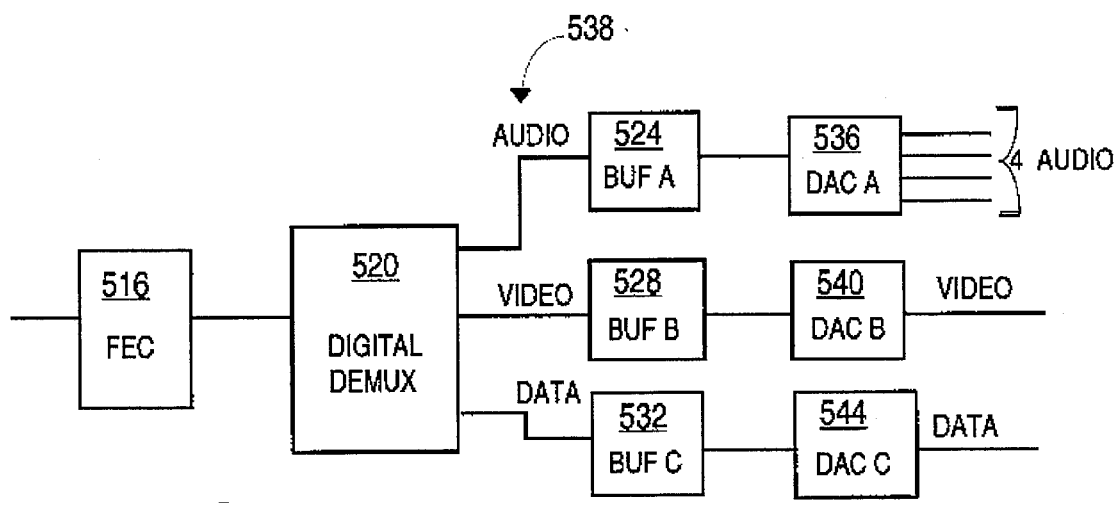
FIG. 5 is a more detailed schematic of an alternative preferred digital embodiment comprising a digital extractor comprising a digital decoder/demultiplexer configuration.
Figure 6:
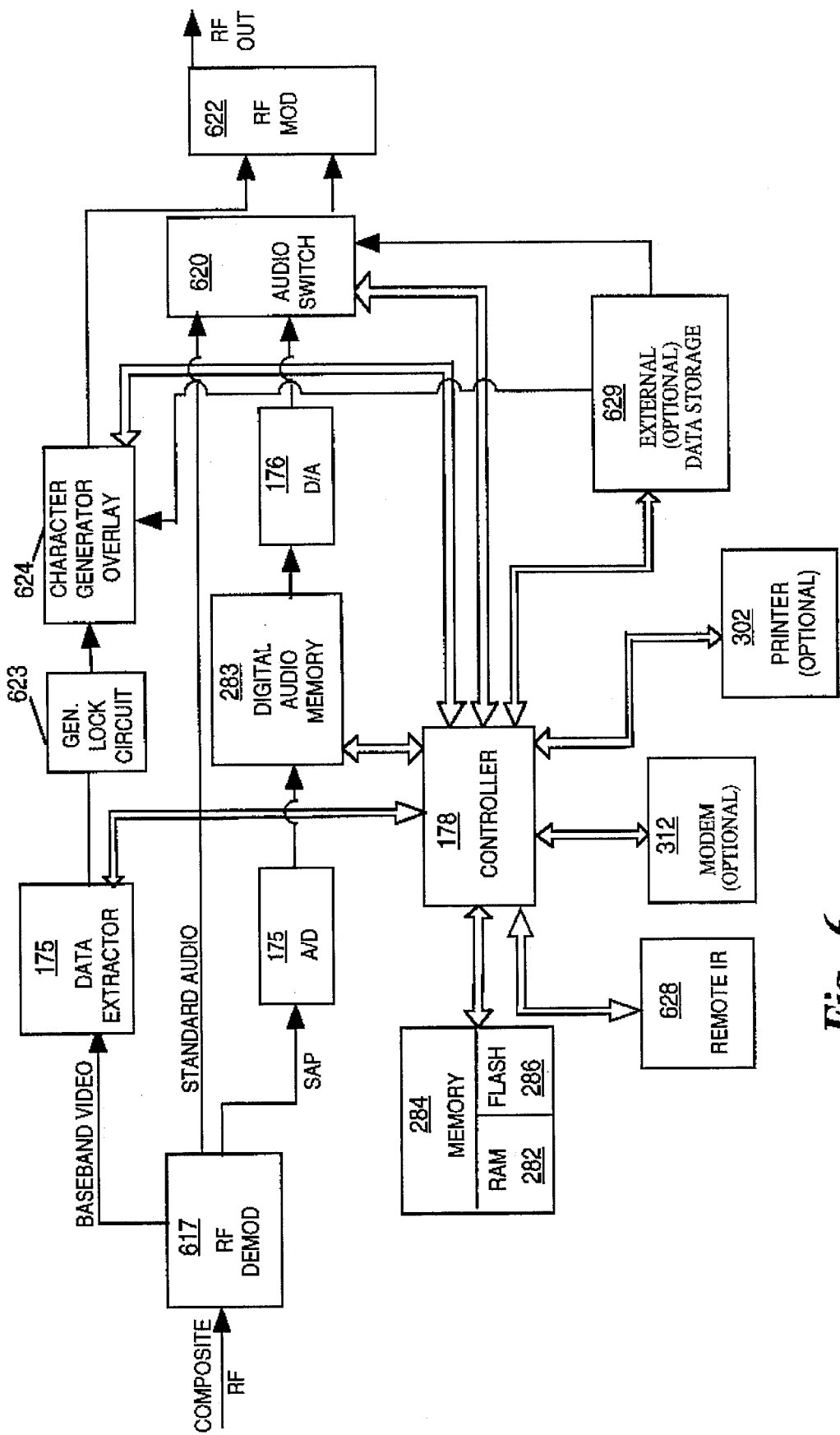
FIG. 6 is a diagram of a second embodiment of the interactive programming box for extracting and storing the interactive audio segments from an SAP audio channel in which the interactive audio segments are serially aligned in the SAP channel at the head-end.
Figure 7:
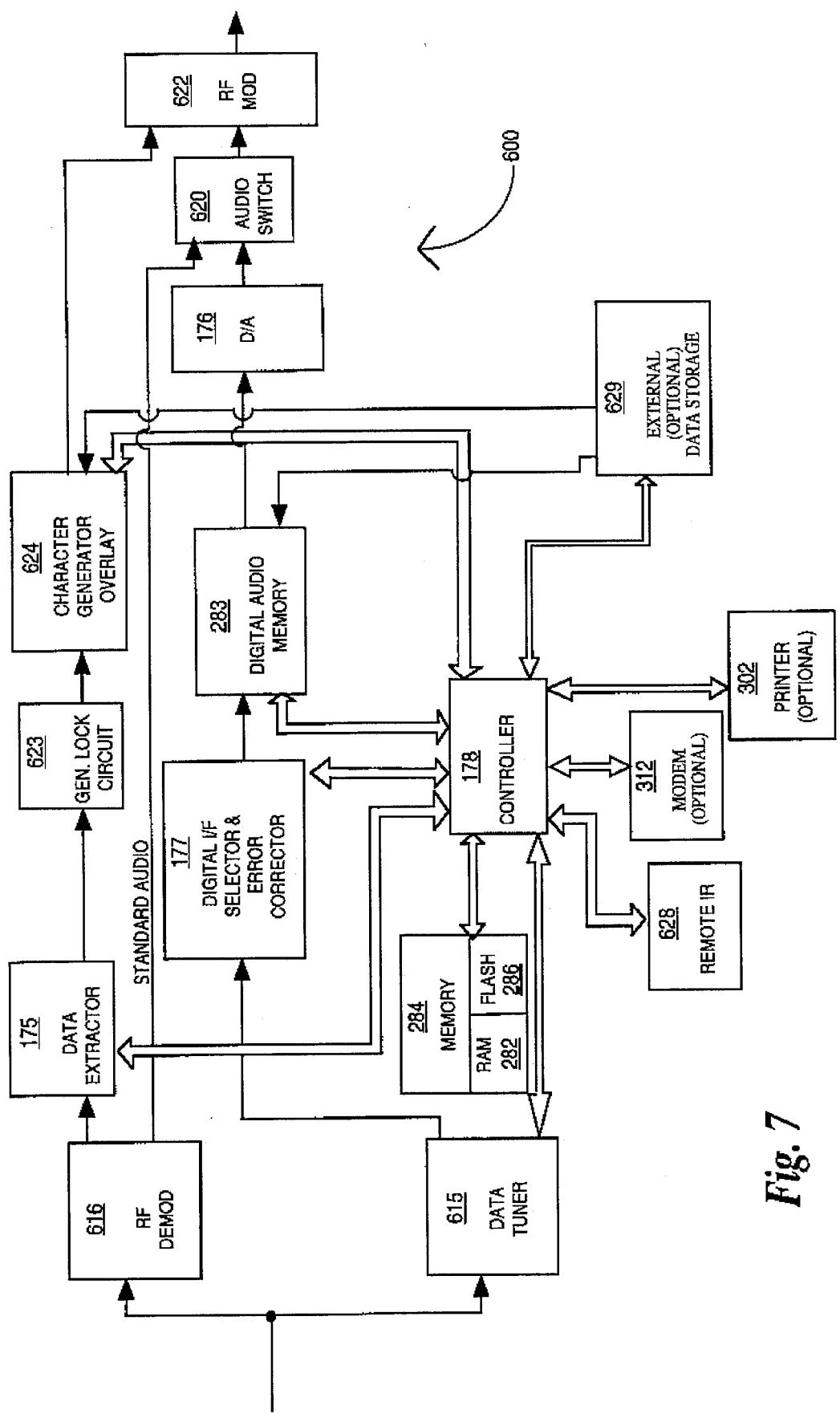
FIG. 7 is a diagram of a third embodiment of the interactive programming box comprising two tuners, one of which is for tuning to and demodulating the standard video and audio signal and the second of which is for demodulating an secondary analog carrier comprising modulated serial digital audio segments.
Figure 8:
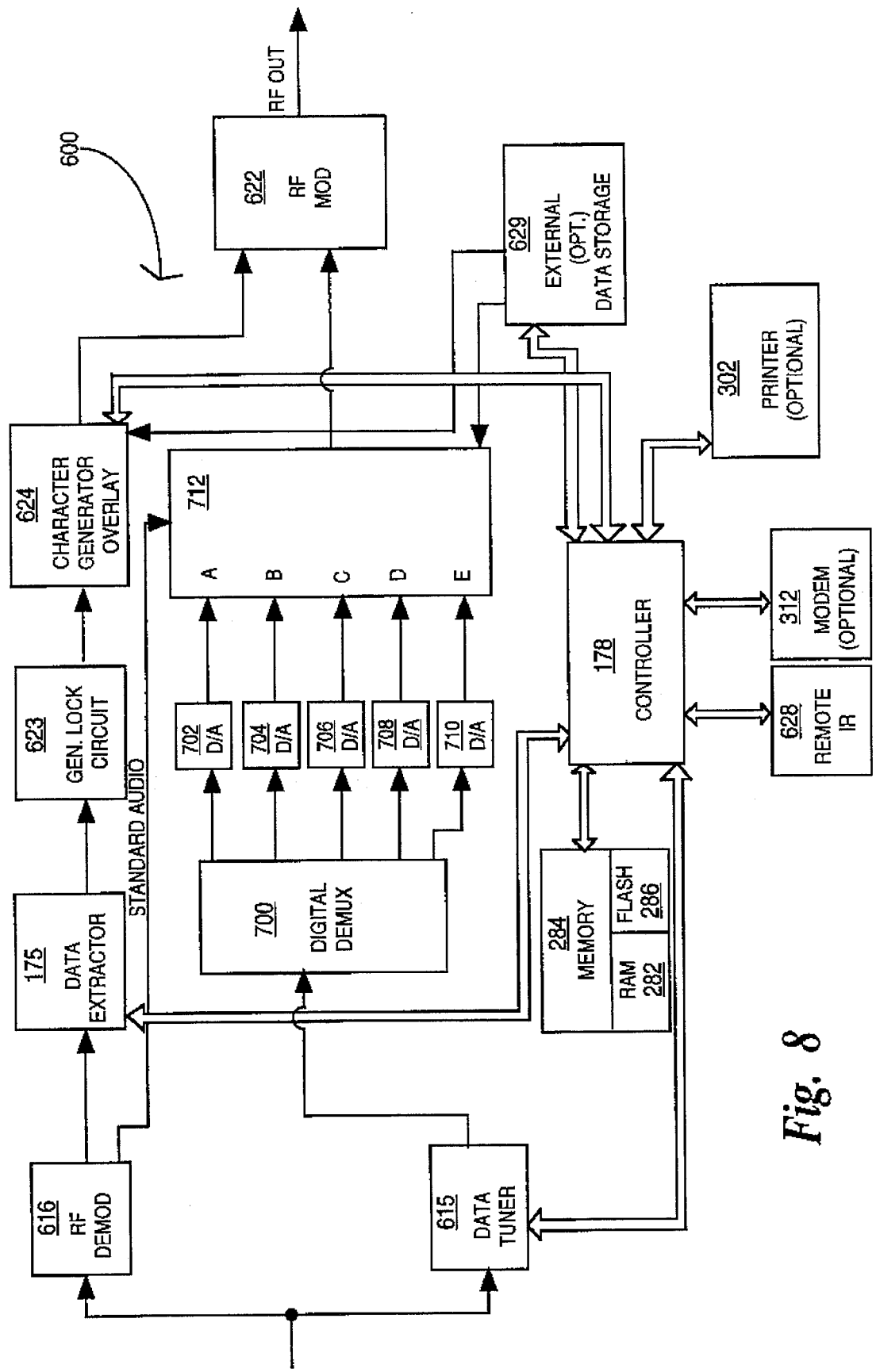
FIG. 8 is a diagram of a fourth embodiment of the interactive programming box also comprising two tuners but with a digital demultiplexer configuration for demultiplexing the digital audio stream into n parallel digital audio channels, wherein the n parallel digital audio channels are time division multiplexed at the head-end and transmitted as a separate digital audio stream.

FIG. 3 shows an overview of a preferred interactive program box 600. FIGS. 4 and 5 show analog and digital embodiments of the audio/data extractor 174, a component shown in FIG. 3. Alternative embodiments of the interactive program box 600 are shown in FIGS. 6–8. The embodiments represent different apparatus for receiving, processing and storing the alternative interactive audio segments which are received in different transmission formats. With these embodiments, the interactive systems are no longer solely limited to selecting audio from multiple parallel tracks of audio, related in time and content, nor is the interactive questions-immediate answer format, as disclosed in previous patents, necessary. Of course, the systems of the present invention can still use the question-immediate answer format or a combination of such format and delayed response via trigger points. The concept remains the same, i.e., to select audio responses which are matched to user selections by some function. However, the current invention, as supported by the disclosed embodiments, goes farther to enhance interactivity by providing the interactive elements at times unknown to the viewer.

The interactive program box 600 is a portion of the system that can reside in the home of the subscriber or elsewhere, such as at a cable headend, as described below. If at the home, the interactive program box 600 is usually located near the subscribers' television 186, but it may be placed anywhere within the range of the subscribers remote handset 604. As shown in FIG. 3, the preferred interactive program box 600 comprises an RF demodulator 616, comprising video and analog demodulators, an audio switch 620, voice/data extractor 174, modem 312, audio memory 702 a controller 178 with associated memory 284, Gent-lock circuit 623, character generator 624, an RF modulator 622 and an infrared interface 628 for the subscriber remotes 604. An external data storage device 629 and printer 302 are optional.

Alternatively, the elements of the interactive program box 600 can be incorporated and provided by a conventional multi-media personal computer 187. Preferably, this computer preferably comprises a video demodulator board, a keypad for entering subscriber selections instead of a remote IR device 604, an extractor board for separating the audio signals and data from the conventional video signal, temporary and permanent data storage, a modem (optional), audio switch and a processor. Operation of the interactive program system using a personal computer 187 is substantially identical to that of the interactive program box 600/television set 186 combination described below.

In addition, although the interactive program box 600 is most likely to be located in the home, there is no reason why the interactive program box 600, or a functional substitute (comprising a processor, extractor, memory, audio switch, RF demodulator, etc.), could not reside at an location external to the home, such as at a cable headend. If the interactive program box 600 is located at the headend, the interactive program box 600, or equivalent, could receive user selections from the home via a wireless RF link, telephone line, cable, etc. Once user selections are received, selection of the audio and graphics signals at the cable headend occurs in identical fashion as if the interactive program box 600 were located in the home, as described below. The path to and from the cable headend can be seen as simply an extension of the cable between the interactive program box 600 and the television set 186. The only possible distinction is that one interactive program box 600 located at the headend may be programmed to service several subscriber homes effectively using a time sharing box among many users.

In a preferred embodiment, the plurality of audio signals are combined with the single video signal along with interactive data and graphics codes in an inserter 130 at the operations center to form a single NTSC compatible video signal. These signals may be analog or digital, as described below.

Referring to a preferred embodiment shown in FIG. 3, the composite interactive signal is received by the interactive program box 600 either via cable connection, if the signal is transmitted over cable, by way of satellite antenna hookup for receiving satellite broadcasts, or by way of a television antenna if the signal is broadcast. The composite interactive signal is input into an RF demodulator 616.

In the standard television mode with no interactivity, the RF demodulator 616 simply demodulates the conventional video and audio signal and outputs the standard audio which passes through the audio switch 620 to the television set 186. The video is forwarded to an RF modulator 622 for presentation on the television. Therefore, in the standard mode the interactive program box 600 is simply a pass-through box.

The voice/data extractor 174 and audio switch 620 are completely bypassed in this embodiment.

In the interactive mode, the video demodulator 616 outputs the standard video signal which is transported to a Gen-lock circuit 623 and character generator 624 as wells as to a voice/data extractor 174. At the output of the Gen-Lock circuit 623 and character generator 624, the video is forwarded via the RF modulator 622 to the television 186. The processor 178 preferably controls an n×1 switch 620, the output of which is an appropriate audio segment to be sent to the television set 186 for presentation to the subscriber. As mentioned above, the internal element of the interactive program box shown in FIG. 3 could be incorporated into a convention multimedia personal computer 187. Of course, the switch could have more than one output, in which case more than one viewer can watch the video on the same monitor and each receives individualized audio response through the use of headphones. The processor 178 sends a command to the audio switch 620 to disconnect the standard audio at the beginning of an interactive segment. The extractor 174 essentially reverses the process by which the audio and data signals were inserted into the video signal. As explained below, the voice/data extractor 174 removes the additional audio segments and data that are hidden in the standard video signal. The data is forwarded to the microprocessor 178 and the audio segments get sent either to an audio switch 620 or to the audio memory 702 depending on where the instructions teach the segments to be forwarded, all of which occurs under the control of the microprocessor 178. The microprocessor 178 reads and interprets the instructions either broadcast in the data codes or resident in the operating software at the interactive program box 600.

The microprocessor 178 interprets the extracted data as either control data, including instructions for switching between voice channels, or graphics data for on screen display. If the data is on-screen display data, the data is preferably prefixed by a command designating the data as on-screen display data, as opposed to control data. In the preferred embodiment, the controller 178 also examines the control data for the occurrence of a header code designating the onset of a trigger point in the program.

If the trigger point codes designate a macro which calls for the placement of a graphics display on the video, the microprocessor 178 reads the codes, accepts any graphics data sent from the head-end 608, calls for and examines the actual bit maps stored in memory 284 or external memory 629 and designating the identity of the characters, and then commands the character generator 624 to overlay particular characters at particular points on the screen. Therefore, the graphics are preferably generated locally with the bit maps stored in memory 284. The graphics are selected for presentation either in predetermined sequence, through the use of control codes in the composite interactive program, developed when the program was created at the operations center 608, or more flexibly through the execution of algorithms by the processor 178 utilizing stored subscriber selections to previous graphic interrogatory messages. The algorithms are preferably part of the operating systems software stored in memory at the interactive program box 600. Alternatively, the algorithms could be included in the data portion of the composite interactive signal.

The graphics can be utilized to overlay any portion of the screen of the television screen. The character generator 624 is locked by a Gen-lock circuit 623 which allows for the synchronous placement of the graphics on the video. The character generator 624 is preferably a standard on-screen display chip which takes incoming video, locks the video and superimposes on the video the characters as instructed by the microprocessor 178. Specifically, the character generator 624 is a switching system which takes the active lines of video and switches to a mode of sending the graphics characters for a predetermined time, and then switches back to the video when the character is finished being written on the screen.

Because the graphics are generated locally, subscribers without the interactive program box 600 are not be able to view the graphics. For those subscribers possessing the interactive capability, the graphics can be used for both posing interrogatory questions to subscribers at the onset of the program, consistent with the trigger point embodiment, posing questions during the program, or used to provide a personalized response to previous individual subscriber selections.

Preferably at the beginning of the program or when a viewer first tunes in, a series of interrogatory messages are presented to the subscriber. The subscriber responds to the interrogatory message by depressing a button on a remote 604 or computer keypad corresponding to an answer selection listed on the interrogatory graphics screen. If the subscriber has made a selection using a remote 604, a signal is received by the IR interface 628 which processes the signal and forwards the signal to the processor 178. The processor 178 preferably creates a packet comprising the user selection and a header code that identifies the particular interrogatory message associated with user selection and sends the packet to memory 284. Each user selection to each interrogatory is stored in this fashion. These selections will be called later in the program at appropriate times when identified by the trigger point codes and then used in macros or algorithms to determine interactive audio and/or graphics responses.

The presentation of the graphics interrogatory messages can also be made a function of subscriber selections to previous interrogatory messages. The logic used in the codes for selecting the next graphics message is similar to that used for selecting audio messages. One method, as disclosed in earlier ACTV patents, is the "decision tree" logic methodology. The subscriber makes a selection to a first predetermined interrogatory graphics message. After the subscriber hears an appropriately branched audio channel, the processor 178 will interpret graphics algorithmic codes sent down from the operations center 608 and will read from memory 284 an appropriate next graphics message. The processor 178 then directs the character generator 624 to overlay the selected graphics message onto the next frames of video.

The voice/data extractor 174 of the preferred embodiment shown in FIG. 3 is shown in more detail in FIG. 4. This particular extractor corresponds to the Pulse Amplitude Modulation (PAM) inserter 219 discussed below in connection with FIG. 9. The audio and data is stripped out of the baseband signal in the four-channel VBI extractor 174. The signal separator 174 essentially reverses the process by which the audio and data signals were inserted into the video signal. A video digitizing system and timing controller 320 digitize the incoming video signal at the same sampling rate at which the PAM audio samples are inserted into the video signal. Alternatively, if a digital adaptive pulse code modulation (ADPCM) extractor, corresponding to an ADPCM inserter described below, is used in the interactive system, the extractor does not include the video digitizing and buffer circuitry shown in FIG. 4.

The timing controller 320, shown in FIG. 4, determines which lines of video contain the audio signals and separates the compressed audio signals by directing each audio channel into an associated FIFO pair 328–356. As with the insertion circuit, the FIFO's in the FIFO pairs 328–356 are used alternately so that while one FIFO is reading the audio data, the other is writing data. The digital-to-analog (D/A) converter 360 sequentially reads from the FIFO for each channel which is in the write mode and converts the digital signal for that channel into an audio signal. The analog output for each channel is filtered by filters 364–376 and directed to buffers 380–392. The buffers 380–392 preferably adjust and amplify the analog output signals to −1 V to +1 V range. The four output audio signals correspond with the four audio input channels.

As shown in FIG. 4, the line 21 data is read into 8-bit shift registers 400 wherein the 16 bits of serial data are converted to two bytes of data. The line 22 data is read by 8-bit shift registers 402 and the 16 bits of serial data are also converted to two bytes of data.

The line 21 and 22 data (i.e., the data codes) are directed from the extractor 174 into the microprocessor 178. The microprocessor 178 decodes the data and stores it in either RAM 282 or ROM 286.

In an alternative voice/data digital extractor embodiment at the receive end, the composite digital signal is received where the FEC code is applied by an FEC decoder 516, as shown in FIG. 5. The resulting signal is applied to a digital demultiplexer 520 where the audio, data and video components are separated and individually buffered in a set of buffers 524–532. From buffer A 524, the composite digital audio signal enters a digital-to-analog converter 536 where the plurality of audio signals (including the standard audio channel and the additional audio channels) are separated, decoded and decompressed to recreate each individual analog audio channel. From buffer B, the digital video signal similarly enters a digital-to-analog converter 540 where the signal is decompressed and decoded to form an analog video signal. The data is similarly decompressed and decoded in digital-analog decoder C 544.

Referring back to FIG. 3, the processor 178 receives data from the extractor 174, stores data and reads instructions from memory such as temporary RAM 282 memory, ROM or FLASH ROM 286 memory, and receives response data from the remotes 604 via an infrared interface 262, or alternatively a computer keyboard. Optionally, the processor 178 can interface to a printer 302 via a printer port 302 for printing out coupon codes, as discussed below. The processor 178 is preferably a 80C188 based microcontroller, but can be any similar controller. As mentioned above, this entire system could be built into a personal computer using a standard off the shelf multimedia personal computer 187 with preferably an 80386 or higher based processor.

The operating system software for the processor 178 is preferably stored in FLASH ROM memory 286. The FLASH memory 286, as shown in FIG. 4, also preferably stores new instructions to use with reprogrammable software. It works in conjunction with RAM 282. The RAM 282 can also be used as an interface to a print buffer. The print buffer is used so that data transmissions to the site can be buffered, error corrected and formatted for printing. The site controller 178 is preferably connected to a printer via a parallel printer port. The controller 178 sends coupons to the printer 302.

The interactive program box 600 connects with the remotes 604 preferably by infrared (IR) connection. The processor 178 preferably stores the setup commands and interactive branching commands and algorithms in associated memory, as described below. In the present invention, code interpretation and switching is preferably accomplished by the interactive program box processor 178. The processor 178 collects subscriber responses from the remotes 604, or computer keypad.

The advantages discussed above in relation to presenting an interactive program using trigger points are obtainable in each of the interactive program box embodiments shown in FIGS. 6–8. In the embodiment shown in FIG. 6, alternative audio segments are preferably sent serially from the operations center 608 in the SAP channel. The demodulator 617 receives a composite interactive signal comprising the standard video and standard audio signal along with an audio subcarrier. The demodulator 617 breaks the signal into it's component parts, forwarding the baseband video to a data extractor 175 and the standard audio to an audio switch 620. The line 21 data extractor 175 takes out the data codes, including the trigger points.

The SAP channel comprises a plurality of audio segments lined up serially. The audio segments are digitized in the analog to digital converter 175 and are preferably stored in digital audio memory 283. At certain times during the program, data codes will designate a trigger point and key the microprocessor 178 to select and play an audio segment corresponding to previous user input(s), according to the process described above. The microprocessor 178 calls the appropriate audio segment(s) from internal memory or external data storage 629 and commands the audio switch to pass the selected audio segment to the RF modulator 622 for play to the subscriber. At the end of the interactive time period, the controller 178 instructs the audio switch 620 to again pick up the standard audio.

In an alternative embodiment similar to that as shown in FIG. 6 and discussed above, the simple addition of a second tuner, receiving the composite RF signal, could be used to tune to a second audio channel for collection of transmitted audio segments. The tuner would pass the audio segments to the A/D converter 175 with the operation of the rest of the interactive program box 600 similar to that described above in connection with FIG. 6.

FIG. 7 shows another interactive program box 600 embodiment for providing alternative audio and graphics segments. This embodiment uses two tuners: an RF demodulator 616 and a data tuner 615. The RF demodulator 616 tunes to and demodulates the conventional video and audio signal in the standard video bandwidth. The data tuner 615 receives a single digital audio signal. The signal comprises digital serial audio segments modulated onto an analog carrier. The data tuner 615 demodulates the signal into digital audio. The digital interface selector and error corrector 177 separates the audio segments and performs error correction according to any error correction scheme commonly understood in the art. The controller 178 directs the selector 177 to extract selected digital audio segments from the serial digital stream and send them to the digital audio memory 283. Selection of one or more audio segments for play as personalized messages on the television set 186 occurs according to the processes described above. After the controller commands the memory 283 to forward a digital audio segment, the segment is converted to analog by the digital to audio converter 176 and is subsequently passed to the RF modulator 622 for play on the television set 186.

Another interactive program box 600 embodiment for receiving, storing and selecting alternative audio segments is shown in FIG. 8. At the operations center 608, the audio segments are digitized, time division multiplexed, modulated and converted to frequencies in unused channel frequency space in the cable television spectrum, e.g., cable guard bands.

The RF demodulator 616 again demodulates the conventional video and audio signal. The data extractor 175 receives the signal and extracts the VBI line 21 data codes. The data in the VBI indicates the frequency channels in which the digital audio segments are transmitted. For example, audio messages A–E are located in between channels 14 and 15. The controller 178 instructs the data tuner 615 to tune to that part of the spectrum between channels 14 and 15. Alternatively, an autotune capability can be used to find the audio channels in the spectrum.

The tuner 615 demodulates the digital audio signal and forwards the signal to the digital demultiplexer 700. The demultiplexer 700 demultiplexes the signal into n digital audio channels and forwards each channel to a separate D/A converter 702–710 where each of the digital channels are converted to analog audio. As described above, one of these channels can be selected as identified at the trigger points for play over the audio speaker to the subscriber. All of the other components in FIG. 8 operate identically to that previously described in connection with FIG. 3 to provide interactive or conventional programming to the subscriber in the home.

The embodiments described above and shown in connection with FIGS. 3–8 relate to different ways of receiving broadcast audio segments. Alternatively, interactive audio segments, or graphics elements, could be prestored on cartridge, CD ROM or even floppy disk. However, the trigger points are preferably broadcast as data codes embedded in the conventional video signal and will work with any of the embodiments described above.

In this manner, each subscriber at different homes hears a different and personalized response from their own television set 186 due to their interaction with the interactive program box 600. As discussed below, the power of this system can be increased exponentially via preloading of additional audio segments expanding personalized delivery and the mechanism of memory branching wherein the system actually remembers and uses the subscriber's earlier selections to present or compose unique messages to the subscriber.

The range of possible audio responses can be dramatically increased by preloading audio segments. First, more than simply the audio response segments broadcast along with a trigger point can be transmitted by preloading the memory at the interactive program box 600. Preloading can be accomplished by sending additional audio segments in a time period prior to that period in which the normal broadcast audio responses are sent.

For example, at the beginning of a program several audio segments can be broadcast to the interactive program boxes 600 by any of the methods and systems described in connection with FIGS. 3–8. The controller 178 directs that these segments be stored in memory. Each audio segment has a pointer which identifies the particular interrogatory message corresponding to an audio segment. For example, if the interrogatory message presented early in the program was the following, "Are you a boy or a girl," an audio segment which might correspond to this question is "Oh, I see, you are a boy." At the time of the interactive element, identified to the controller by the trigger point codes, preferably more audio responses associated with the earlier presented interrogatory message are output from the operations center 608, passed through an audio mixer 118, embedded in the video signal at the inserter 130 and transmitted to the remote sites. Once received at the interactive program box 600, the audio responses are extracted from the video signal and forwarded to the switch 620. The controller 178 then either selects an audio response made of prestored audio segments in memory or one of the audio segments broadcast with the trigger point codes. The switch 620 branches to the appropriate channel to forward either one of the segments from memory or one of the recently broadcast segments. At the end of the interactive period, the switch 620 branches back to the standard audio.

Even more enhanced and flexible operation can occur through the addition of external data storage 629, such as CD ROM or cartridge. For example, sports statistics or other information on athletes or others can be stored in CD ROM. During live sports event either audio segments or graphics displays focusing on the athlete can be called by the processor 178 and presented to the viewer as a function of user selection of an option or at a trigger point if the user indicated during queries at the beginning of the live event that they were interested in a particular player.

In the present invention, the interactive audio branching is preferably performed in the interactive program box 600. The branching algorithm, preferably defined by a series of branch codes, can be inserted as part of the program. The processor 178 stores the algorithm in associated RAM memory 282. The algorithm determines the proper channel to switch to as a function of the subscriber selection.

The branching algorithm can be expanded by utilizing previous user selections in making a decision on a current audio segment. This is the memory branching embodiment. In other words, previous user responses, stored in RAM memory 282 in the interactive program box 600, are used as input to a logic network, or algorithm. Successive audio output segments can be related in a "decision-tree" type relationship. The logic network, or algorithm, processes the data input for selection of an audio output response message. This memory embodiment goes well with the expanded audio response capability described above.

The memory branching technique, described above, can work similarly for basing successive graphics interrogatory messages on previous subscriber selections to earlier graphics interrogatory messages.

Another embodiment uses "stacking" to increase the audio answer response options. The expansion is due to linking separate audio segments separated in time to form a greater number of answer responses. The following example illustrates the use of stacking as well as memory branching, described above. The left hand column of the example shows the interactions between the program and the subscriber. The right hand column shows the logic applied and branching performed in the interactive program box 600.

| TYPE OF INTERACTION | ACTION TO BE PERFORMED |
|---|---|
| 1. Can you tell time? | • Store button pressed in |
| (1) YES | memory A |
| (2) | • If button=1, go to track 1 |
| (3) | • If button=2, go to track 3 |
| (4) NO | • If button=3, go to track 3 |
|  | • If button=4, go to track 2 |
|  | • If no button pressed, go to track 3 |
| RETURN |  |
| FROM BRANCH | GO TO TRACK 1 |
| 2. What time is it? | • Store button pressed in |
| (1) 2:30 | memory B |
| (2) 3:30 | • If button=1, go to track 1 |
| (3) 3:50 | • If button=2, go to track 2 |
| (4) 4:00 | • If button=3, go to track 3 |
|  | • If button=4, go to track 4 |
|  | • If no button pressed, go to track 4 |
| NOTE: 3:30 (button (2)) is the correct answer. | |
| Recall response from | • Recall memory A and branch as |
| question 1 | follows: |

| TYPE OF INTERACTION | ACTION TO BE PERFORMED |
| --- | --- |
| TRACK 1: "You said you know how to tell time . . ." | • If memory A=1, go to track 1 |
| TRACK 2: "You said you don't know how to tell time . . ." | • If memory A=4, go to track 2 |
| TRACK 3: "You didn't indicate if you can tell time . . ." | • If memory A=2 or 3, go to track 3 |
| Memory branch | • Branch as follows: |
| TRACK 1: ". . . and you weren't kidding. Great Work!" | • If memory A=1 and memory B=2 (correct) go to track 1 |
| TRACK 2: ". . . but you sure learned fast. That's great." | • If memory A≠1 and memory B=2 (correct) go to track 2 |
| TRACK 3: ". . . and with more work, you will learn more." | • If memory A=1 and memory B=1, 3 or 4 (incorrect) go to track 3 |
| TRACK 4: ". . . but with more work, you will learn more." | • If memory A≠1 and memory B=1, 3 or 4 (incorrect) go to track 4 |
| RETURN FROM BRANCH | GO TO TRACK 1 |

Stacking is evident in the above example by the increased number of optional audio messages formed by linking the later two branches indicated in the example above. The possible branch combinations are provided, as follows:

Branch #1 to Branch #1
  Branch #2 to Branch #2
  Branch #3 to Branch #2
  Branch #1 to Branch #3
  Branch #2 to Branch #4
  Branch #3 to Branch #4

Therefore, the present invention covers numerous methods for increasing the interactive audio response capabilities.

C. Subscriber Interface

Each student interacts with the system via a subscriber interface (or "remote") 604 or a computer keyboard.

The keypad 604 preferably comprises a number of functional keys. The keypad 604 preferably comprises keys labelled 0–10, "YES" and "NO" labelled keys, and "TRUE" and "FALSE" labelled keys can be accommodated by the present invention. The invention can also accommodate an LCD panel for receiving messages and confirming answers. Similar functions can be assigned to computer keyboard keys.

Addressability and authorization occur preferably using techniques well known in the cable industry. For example, program selection and authorization can occur using menus on the screen with cursor overlays. Through the menu system, a viewer can access a program by inserting a unique ID code, billing number, etc. Macro access algorithms stored in memory in the interactive program box enable entry.

Either at the beginning of the interactive program, as in the preferred embodiment, or alternatively as the program progresses, the subscribers are requested to enter responses via the keypad 604 or computer keyboard. These requests are preferably displayed on the TV monitor 186 or computer screen through the use of graphics overlays. The interactive programing preferably consists of graphics interrogatory messages with correct and incorrect answers overlaid on the video.

The keypad 604 or computer keyboard allows the subscriber to interface with the interactive programming by depressing keys corresponding to answers of an interrogatory message. For example, in a multiple-choice question mode, each participant selects a keypad button corresponding to his or her choice. These selections are preferably stored and later used by the controller 178 in selecting either an audio or graphics message and either directing the audio switch 620 to switch from the standard audio channel to an alternative audio channel for passing the respective audio segments to the television 186 or to direct the graphics character generator 624 to overlay graphics characters over predetermined portions of the screen. The user selection is mapped into one or the plurality of audio responses, comprising one or a combination of linked audio segments, or one of a plurality of graphics messages after the user selection is applied to a some functional algorithm.

D. Program Preparation

For the present invention, it is anticipated that the majority of the interactive programs will be produced off-line and thereafter recorded for subsequent broadcast on some storage medium at a central location. Alternatively, live programs could be broadcast with the interactive elements inserted in similar fashion to those techniques described in the parent case.

The broadcast or operations center 608 is where the task of either recording and broadcasting or creating and packaging the composite interactive programs is preferably performed. These programs are created to be received and viewed as both regular conventional television programs and as an interactive programs. Therefore, they must be created in such a manner that there is no noticeable difference to those noninteractive subscribers watching the conventional program when the interactive portions begin for authorized interactive subscribers. Likewise, when the interactive portions end and both groups of viewers again view the same video and hear the standard audio, there should be no noticeable transition.

The composite interactive programs that can be created include educational programs, home shopping programs, movies, children's programs, news programs, etc. The stored programs may be in analog or digital form and stored in permanent or volatile memory sources. In addition, live programs can be enhanced with interactive elements and broadcast to subscriber homes as part of the present invention.

The interactive program used in the present invention preferably comprises a single video, a standard audio channel, graphics and data codes, and a plurality of audio signals embedded therein to achieve interactivity. However, as described and shown above in connection with FIGS. 3–8, the audio can be sent on separate channels, preloaded at the interactive program box 600, or stored separately in external data storage.

Any of these embodiments will work with the interactive trigger points of the current invention. The program must first be produced in a studio. The resulting program will comprise the conventional video and audio receivable on any television set 186. Next, the desired interactive sequences must be defined. The producer must decide which portions of the program will be interactive. These portions will be identified by trigger points. These trigger points correspond to the times when the program can be altered. The trigger points are essentially codes that will call macros that will be used to trigger the occurrence of each interactive sequence during the program.

Therefore, the producer must decide at what points in the program to include the interactive responses, i.e. the trigger points. The interrogatory messages required for soliciting viewer interests and answers must also be scripted. The alternative audio and graphics responses to possible viewer selections are also created by the producers. Next, the interrogatory messages, with possible system responses, must be mapped into predetermined trigger points. This mapping is made possible by developing an algorithm on a personal computer. The algorithm maps specific system responses (audio or graphic) to occur at the trigger points as a function of viewer selection(s). For example, if the user selects A to interrogatory #2, a predetermined audio or graphics response is selected to play at an identified trigger point.

Next, software in a personal computer compiles the above mapping into program transmission codes. The personal computer then controls the loading of the audio and data into the program stream at the appropriate times and inserts the codes into fields. Timing and control between the video and multiple audio elements, discussed above, are provided through the use of data codes. The data codes are stored in memory in a personal computer as part of the ACTV programming language. The codes comprise commands, or branch codes, for branching between channels (as discussed in the aforementioned ACTV patents and applications), timing signals for controlling the interactive program, codes defining each trigger point, data or text, commands for termination and initiation of interactive programming viewing, or triggers for executing macros.

Finally, the operating system software must be developed and loaded into the interactive program box 600. This software can be uploaded to the box on the cable and stored in RAM memory 282, loaded onto a cartridge or placed in ROM memory 286. This software comprises the macros that interpret subscriber inputs and map these inputs into specific interactive elements at a trigger point during the program.

At this point, the audio segments can be stored in a multichannel tape storage device or digital device for later use. When it is time for broadcast, the video and standard audio pass to an inserter 130 to be combined with the data codes and multiple audio channels at the appropriate time as commanded by a processor. As shown in FIG. 1, the audio channels are preferably fed from the personal computer 114 into an audio mixer 118. Furthermore, this processing can be utilized to align the different audio response tracks in time.

Figure 9:
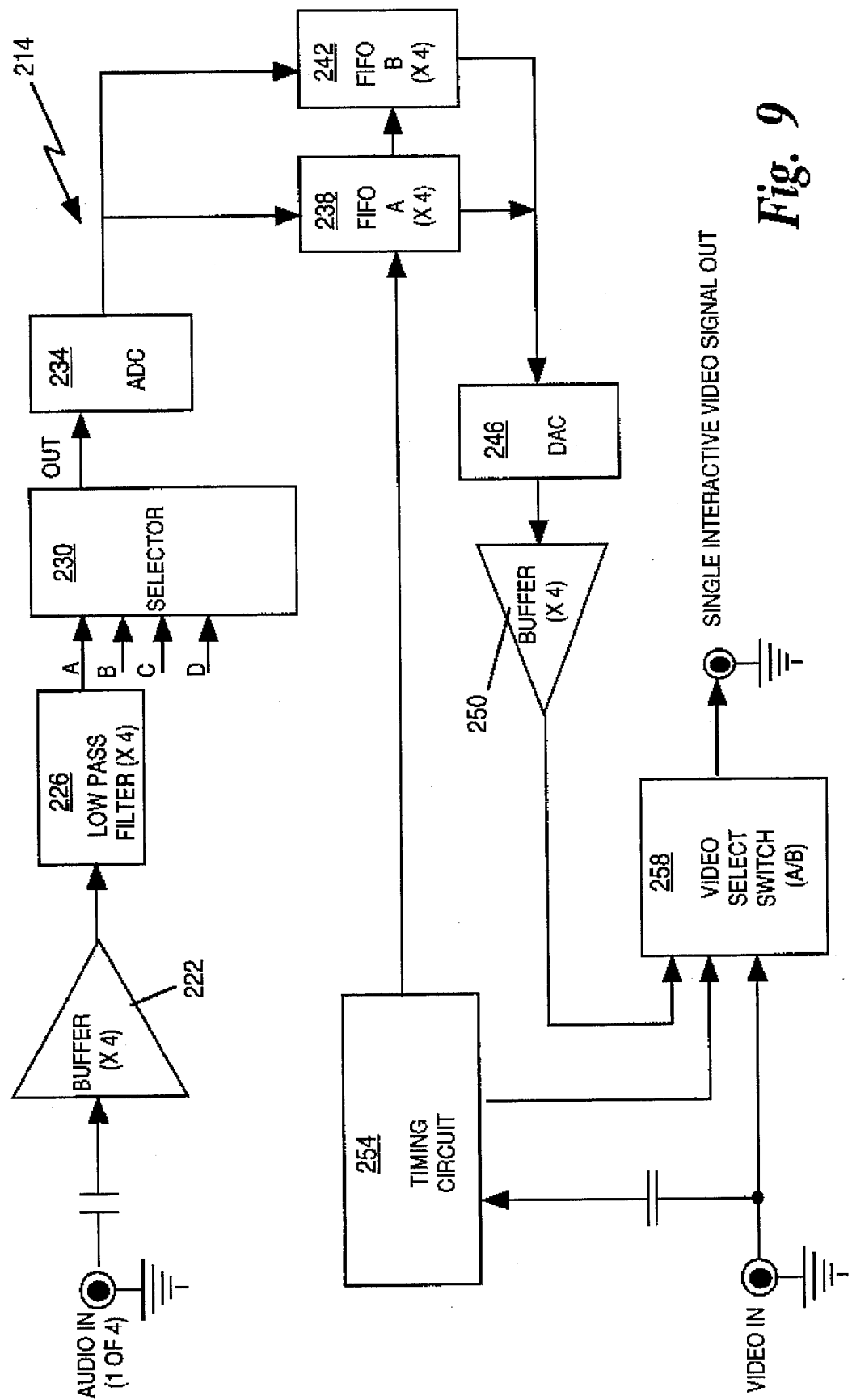
FIG. 9 is a diagram showing the hardware elements of a preferred analog transmission embodiment at the operations center comprising an inserter for embedding four audio circuits and data commands into a single video signal.

The analog inserter 214 of a preferred embodiment is shown in more detail in FIG. 9. The four audio output channels are fed into the inserter 214 to be mixed with the video and data. Each audio signal is preferably an analog signal. A buffer 222 is provided for each audio signal to electrically isolate the audio inserter 214 from the source of the audio signals. An amplifier amplifies the signals in order to converts the analog audio signals to a format which is fully compatible with the analog-to-digital (A/D) converter 234 discussed below.

The output of each buffer 222 is directed to a bank of low pass filters 226, one for each audio signal. In addition to reducing high frequency noise from the audio signal, the low pass filter 226 clips the audio signal to a desired frequency. The filtered audio output signals of the low pass filters 226 are directed as inputs to a multiplexer 230.

In a preferred embodiment, the multiplexer 230 is controlled by timing signals received from the timing circuit 254. The timing circuit 254 is synchronized with the video signal of the interactive program and controls the multiplexer 230 to sequentially take a sample from each audio signal and to direct the sample to an analog-to-digital (A/D) converter 234. The A/D converter 234 converts the samples of the four audio signals to an 8-bit digital format.

As shown in FIG. 9, each of the four audio channels preferably has an associated first-in first-out (FIFO) pair 238, 242. The 8-bit digital samples for each signal are directed as an input to one of the FIFO pair 238, 242 associated with that signal. The samples for each channel are preferably directed to one of the FIFO pair 238, 242 for that channel until enough samples are in that FIFO to fill the desired number of lines of the video field into which the sampled audio is to be inserted. The audio samples are then directed to the other FLFO of the FIFO pair 238, 242 for that channel until that FIFO has the correct number of samples. In the meantime, the contents of the first FIFO are written onto the video signal. It is foreseen that other types of memory means may replace the FIFO pair 238, 242.

When the content of a particular FIFO is to be inserted into the video, the digitized audio samples stored in that FIFO are directed (first-in-first-out) to a digital-to-analog (D/A) converter 246, as shown in FIG. 9. The D/A converter 246 converts the stream of digitized audio samples into an analog PAM (pulse amplitude modulated) signal. A second buffer 250 is provided for electrically isolating the inserter circuit from the switching circuitry 258 which multiplexes the audio signals into the video signal.

In a preferred embodiment, the audio signals A and B are each Inserted independently onto 5 lines of one field of the video signal, and audio signals C and D are inserted independently onto 5 lines of the other field of the video signal. In order to enable continuous audio playback for each channel, the audio for each channel must be compressed so that 5 lines of video per frame contain enough audio content for the playback time of one frame of video (about 1/30th of a second).

The number of samples of audio required for each channel depends upon the desired sound quality. If lower sound quality is desired, fewer lines of video may be used, and vice versa.

In the preferred embodiment five (5) lines of video are used per frame per channel of audio, with 105 samples per line at a sampling rate of 15,734 samples per second. The multiplexer 230 sequentially samples each audio signal 15,734 times per second and alternatively directs 525 samples to each of the FIFO's 238, 242 associated with each audio channel. At a predetermined time before the audio from each channel is to be inserted into the video signal, the timing circuit 254, shown in FIG. 9, instructs the full FIFO for the channel to write the digital audio to the D/A converter 246 which converts it to a PAM signal. The timing circuit 254 then switches the video selector 258 to receive the PAM audio signal through the buffer 250 as an input in lieu of the video signal. In this manner, the additional audio channels are inserted into the video. The standard audio remains unaffected in the normal audio carrier. Once the audio has been inserted into the video at the desired location, the timing circuit 254 commands the video select switch 258 to change its input back to the video signal. This process is repeated for each audio signal at the video lines wherein that audio signal is to be inserted into the video signal.

Typically, ten lines of the Vertical Blanking Interval (VBI) of the video signal are available for use in each field of video. In the preferred embodiment, for each frame of video, audio signals A and B are each inserted on five lines of the VBI of one field, and audio signals C and D are each inserted on five lines of the VBI of the other field. The desired audio quality and number of audio channels dictates the number of lines of video which must be used to transmit the signals. Preferably, all of the additional audio channels can be inserted into the VBI. However, because of regulations regarding broadcast transmissions and other uses of the video lines, if more lines are required for the audio services then active picture lines may have to be used. These active lines can be grouped and placed at the top or bottom of the picture which effectively will nor interfere with the viewed video due to the overscanning of most television sets.

Alternatively, the lines can be randomly interspersed throughout the program.

In the preferred embodiment, data is preferably sent on line 21 of the vertical blanking interval (VBI) using the predefined standard for transmitting data on line 21. The line 21 data is preferably sent as 16 bits of serial data per field, and is placed into the video signal using a standard line 21 encoder. However, the data can alternatively be inserted on other lines of the video.

In an alternative embodiment, instead of inserting analog PAM samples as shown in FIG. 9, multi-level digital samples, such as ADPCM samples may be inserted into the assigned VBI lines. In this embodiment, a bandpass filter would filter the wideband analog audio in the desired frequency range. The signal is then sampled at some frequency rate in a sampler. Next, the PAM audio samples are quantized into one of n levels. An encoder then maps the amplitude levels selected by the quantizer into preferably a three bit ADPCM samples. These samples are buffered and preferably converted from binary to an 8-level converter. The ADPCM audio samples are then inserted in the video at the direction of a processor into the designated VBI lines. At the receiver, the corresponding extractor 174 sends the signal to a digital to analog converter and subsequently to a low pass filter to receive the filtered analog output. This embodiment has the advantage of reducing end-to-end quantization noise and provides some degree of immunity to channel noise and to noise resulting from VCR recording and playback of the video/analog signal.

Several additional audio signals may be transmitted along with the interactive video signal in other ways. An audio signal may be transmitted over each of the normal audio channels. The audio may be distributed in many ways using the available audio channels. For example, high quality background music for the interactive program could be transmitted over the normal audio channel. Then, lower quality audio for voice-overs could be inserted onto the video signal and/or using the SAP signal. Preferably, the audio segments are aligned serially in the SAP channel. This would enable a larger number of audio signals to be transmitted with the interactive program. In addition, the audio channels could also simply be combined with the video and data signals via a frequency division multiplexer. The audio channels can be digitized using any common analog-to-digital conversion technique such as PCM, DM, ADPCM, etc. Finally, vocoders (e.g., LPC, APC, channel vocoders) can be employed to reduce the required data rates and bandwidth requirements for transmitting voice.

Thus, there are many variations in which the present invention may be used to facilitate the transmission of multiple audio channels. In one possible alternative embodiment, instead of embedding the plurality of audio channels in the video signal, the channels are all sent as one audio signal using serial sequencing. Serial sequencing is defined by reading the audio tracks from memory serially in sequence (i.e., A1, then A2, then A3, etc.). The resulting signal is then sent as a secondary channel, or SAP channel, with the primary channel containing the standard audio. In this embodiment, these particular audio tracks would have to be sent prior to the time when the answers are scheduled to be played to the subscribers. Therefore, when the SAP channel is received at the interactive program box 600, the signals will be independently decoded from the SAP channel, buffered and stored in memory 284 for later use when it is appropriate to playback the responses to the subscriber. The interactive program box 600 for this embodiment is described above and shown in FIG. 6.

Alternatively, the interactive system of the present invention can provide for transmission of the interactive signal by digital transmission means, resulting in reduced bandwidth requirements. In the digital transmission embodiment the interactive signal can be transmitted by not only satellite but ATM, Sonet, T1 or any other digital transmission system.

Figure 10:
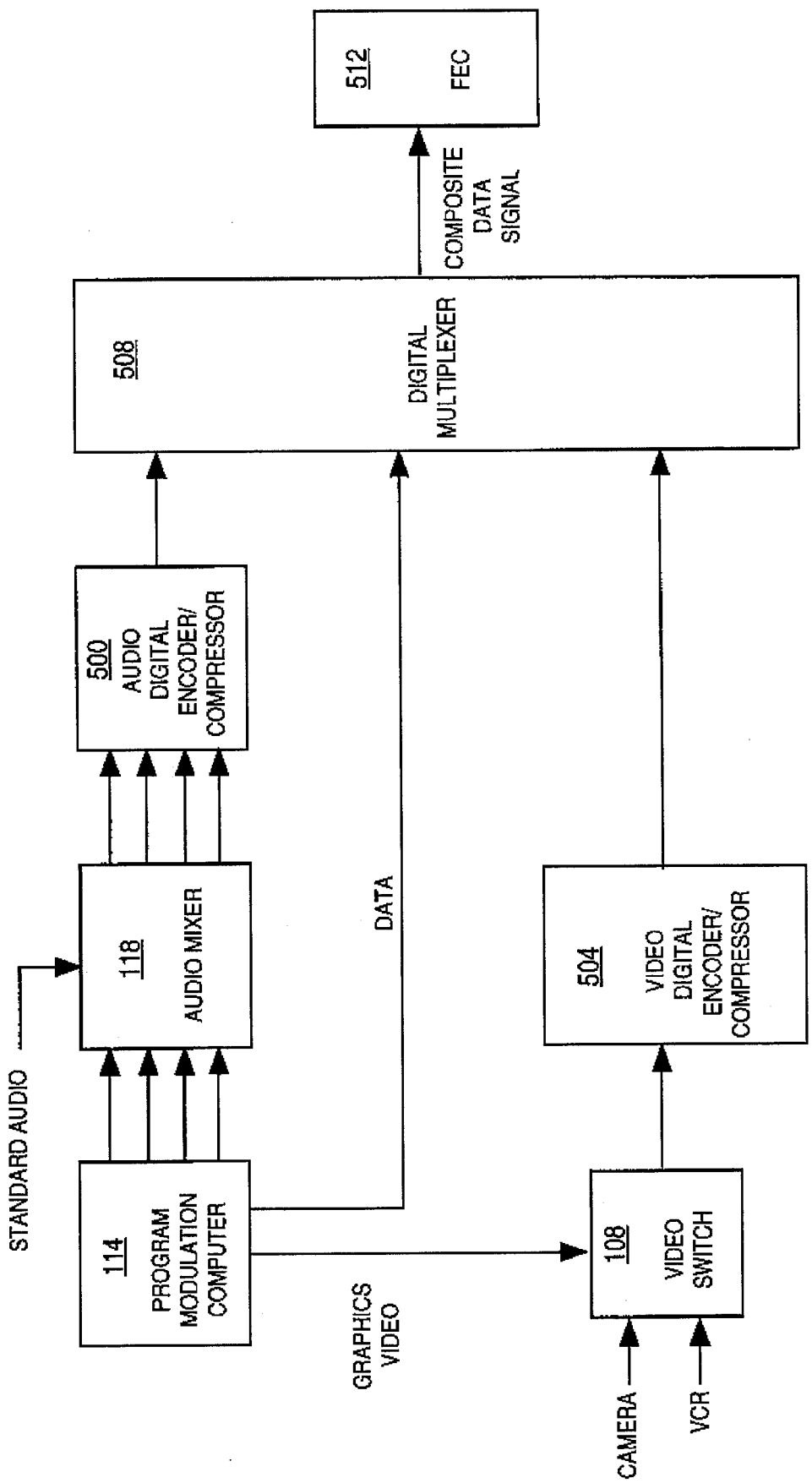
FIG. 10 is a block diagram showing the hardware elements at the operations center of a digital transmission embodiment comprising digital encoder/compressor configurations and a digital multiplexer.

The digital transmission components at the operations center 608 are shown in FIG. 10. As shown in FIG. 10, the plurality of audio signals are output from a personal computer 114 or tape storage device and mixed in the audio mixer 118 with the conventional audio, preferably resulting in four output channels. The audio signals are then preferably sampled, encoded and compressed in the audio digital encoder/compressor 500. The encoding technique can be a waveform coding technique such as PCM, ADPCM or DM. Alternatively, the signals can be encoded using synthesizer or vocoder techniques such as MUSICAM, Linear Predictive Coding (LPC), Adaptive Predictive Coding (A.PC), and Sub-band coding. A single composite audio signal is output from the audio digital encoder/compressor 500.

As shown in FIG. 10, the video signal is input into the video switch 108 which outputs one of the video signals. The video digital encoder/compressor 504 takes the video signal, encodes and compresses the signal according to a known standard such as MPEG-1, MPEG-2, JPEG, or other DCT based coding scheme, wavelets, fractals or other transform based approaches. Alternatively, the video digital encoder/compressor 504, shown in FIG. 10, could utilize a waveform based technique, such as PCM, ADPCM, or DM, for encoding and compressing the video signal.

The data from the personal computer 114, in FIG. 10, is preferably compressed via a board in the computer 114 and delivered directly to the digital multiplexer 508. The digitized data, video and audio signals are delivered to the digital multiplexer 508 where the signals are buffered and combined via time division multiplexing, with appropriate synchronization signals applied, to form a composite sync serial data stream. At the output of the digital multiplexer 508, forward error correction (FEC), the code depending on the selected transmission path, is applied by an FEC encoder 512. The composite interactive digital signal is then transmitted to the receivers 158 via a suitable transmission means such as satellite, fiber optic, cable, DS, etc.

In summary, the operations center 608 creates and transmits an interactive video signal by taking video, inserting multiple audio channels and data codes, and transmitting the resulting interactive video signal to the transmission system.

E. The Transmission System

As shown in FIG. 1, the system uses an interactive program delivery system 98 with any broadcast transmission means including satellite 150, cable 138 or television 142 to deliver the interactive program for distribution to the subscriber homes. Likewise, distribution of the signal at the receive end can be by any suitable transmission means 166 including a cable distribution system, fiber optic, etc. In a satellite broadcast transmission 150, the interactive video signal is transmitted to uplink equipment 146 where it may be multiplexed, upconverted, modulated, amplified and transmitted by satellite 150 to a receiver site 154 for distribution to the classroom locations. In the analog environment, the interactive video signal enters an analog receiver 158 and then preferably a cable distribution system 166 that directs the signal to subscriber locations. In the alternative digital embodiment, the composite digital interactive signal enters a receiver 158 where it is demodulated and then preferably passed to a digital cable distribution system that directs the signal to the subscriber locations. Although a cable distribution system 166 is the preferred transmission media to the remote sites, the interactive video signal may also be distributed by any conventionally known technique, such as DBS, fiberoptics, low or high power broadcast television, telephone lines, cellular networks, and similar technology can be used interchangeably with this program delivery system.

F. Return Path

If desired, status messages and participant information can be sent back from the remote sites to the operations center 608 via return paths. For example, subscriber selections could be stored in RAM 282 and later forwarded to the operations center 608 to aid in creating a subscriber profiles for targeted advertising. The return paths can be dial-up telephone lines or via an X.25 packet switched network, cable, wireless networks, etc. The preferred method of sending this information back is based on subscriber initiation. The alternative method of sending this information is by polling the remote sites from the operations center computer 114. Alternatively, the remote sites can send performance information and messages after consolidation, at periodic intervals.

If the interactive program box 600 functions are performed at the cable headend as part of a multi-user system, as described above, then the return path takes on greater importance. However, the path to and from the cable headend can be viewed simply as an extension of the signal path between the interactive program box 600 in the home and the television set 186.

Input can be transmitted back to the operations center 608 in a two way cable system or in a telephone system via a modem 312. The modem 312 is connected to the controller as shown in FIGS. 3 and 6–8. The controller could send to the modem 312 a series of data streams characterizing the viewer's particular interests.

III. System Operation

The simulcast system operates through the preparation, transmission and reception of a composite interactive program that can provide an interactive program to those subscribers' homes equipped with an interactive program box 600 and a regular television program for those homes not so equipped. As mentioned above, this dual functionality is provided by preferably embedding in primarily the non-visual intervals of a standard video signal a plurality of audio segments, graphics data and programming control data, the reception and processing of which provides a fully interactive experience for subscribers. Alternatively, the audio segments can be prestored at the interactive program box 600, stored in external data storage 629, sent down in serial fashion on the SAP or sent serially or in parallel on a separate channel.

Information is stored on each audio segment. Each audio segment comprises messages in response to user selection(s) on the keypad 604. When the program begins, an INITIATION command is sent from the broadcast or operations center 608 to all the interactive program boxes 600. The television set 186 is directed to default to a predetermined channel (e.g., channel 1).

Initially, the unauthorized and authorized interactive subscribers view the same standard television program with both viewing the standard video and hearing the standard audio. For noninteractive subscribers, the standard video and audio is all they view and hear for the entire program. The interactive subscribers, on the other hand, are able to interact with the program during designated time periods.

At some point in time, trigger point codes are embedded in the composite interactive program signal, the trigger points indicating the initiation of an interactive program. The VBI data codes immediately inform the interactive program box 600 that the program is interactive. The controller 178 begins decoding the codes after detection. Graphics codes will also be sent as part of the signal. These codes enable the interactive program box processor 178 to read the graphics bit maps from memory 282,286, corresponding to the codes, and direct the character generator 624 to overlay the graphics onto a predetermined portion of the screen. In this manner, the first graphics interrogatory message can be displayed on the screen.

While in the preferred embodiment and for purposes of illustration, the graphics messages are interrogatory, they may also be instructional, request user to select amongst several options to receive special features, provide status, or request subscriber profile information from the subscriber. The graphics overlay may consist of simple alphanumeric characters forming a message or more sophisticated characters such as pictorial cartoon characters. While both the interactive and noninteractive subscribers are hearing the standard audio, the interactive viewers are requested through the use of the graphics overlay to enter a choice on their keypads 604 or if the viewer is interacting via a personal computer 187, the keyboard connected to the personal computer 187.

In this manner, at the next trigger point, the controller directs the audio switch 620 to cut away from the standard audio and begin to play an introductory message such as "Hi, welcome to the show, this is an interactive show. Would you like to interact with the show?" If the viewer desires to interact, he or she depresses the YES button on the remote, and the interactive show will begin. If the viewer does not wish to interact with the program, the controller directs the audio switch to branch back to the standard audio and the television will pick back up the conventional television program in progress.

Simultaneously, a BEGIN INPUT command is sent to all of the interactive program box controllers 178 instructing then to accept input from the infrared remotes 604. The last input before the expiration of the INPUT period is accepted as the subscriber's selection by the system.

After the viewer has properly indicated their desire to interact with the program, preferably a set of graphics interrogatory messages will be presented one after another to solicit user selection useful for obtaining desired viewer information. For example, assume the show being presented is a show on redecorating a kitchen. First, an audio segment will be played stating "Hi, this is a show on redecorating your kitchen, are you interested in redecorating your kitchen, YES or NO"? If the user selects the YES button on the remote, another audio segment may play "Well, thank you very much. Let me ask you a couple of quick questions on the display." At this point, the microprocessor 178 accesses a series of graphics interrogatory messages stored in memory 282,286 and directs the overlay chip 624 to display the graphics messages in predetermined order. The user responses to these questions are used later in the program at particular trigger points for presenting interactive messages to the viewer. A series of sample interrogatory messages may be displayed in succession as follows:

"DO YOU HAVE WINDOWS IN YOUR KITCHEN?
   A. YES
   B. NO,"
"HOW BIG IS YOUR KITCHEN?"
   A. 10*20 B. 20*30 C. 30*40 D. 40*50 E. 50*60"
"WHAT IS YOUR COLOR SCHEME?
   A. WHITE B. BROWN C. BLUE D. GREEN E. YELLOW"

"WHAT TYPE OF FLOOR DO YOU HAVE?
A. WOOD B. FORMICA C. TILE"

Preferably, no audio accompanies the display of the graphics interrogatory messages. The selections made by the user above are received by the interactive program box 600, tagged with a code designating the particular related question and stored in memory 282,286 for later use at the appropriate time. When a trigger point is identified by the controller 178, the embedded data codes will identify the question corresponding to that trigger point. The controller 178 will access the memory location address identified with the particular question and request the transfer of the particular user input answer to that question. This user input is mapped via some algorithm into an appropriate audio segment.

For example, suppose the narrator in the conventional program is currently discussing the size of the kitchen. At the next trigger point, the controller will access the memory location corresponding to the kitchen size question listed above. Assuming the user selected response "A. 10*20", the subcontroller may select and forward the following audio response to the audio switch, "Since you have a very small kitchen, may I suggest that you not put a dining room table in your kitchen." At the conclusion of this segment, the controller directs the controller 178 to switch back to the standard audio. At the next trigger point, a similar sequence as described above will occur. In this manner, personalized interactivity is provided at unexpected times to the subscriber.

For unauthorized subscribers, the interactive program box 600 acts similarly to a cable set top converter box. However, the interactive program box 600 is not required for reception of the conventional program by noninteractive subscribers. If the subscriber has the box 600 but is not authorized to interact with the program for some reason, the video demodulator 616 simply demodulates the signal and the standard audio and video are transferred through the audio switch to the TV set 186 for presentation for the subscriber.

Another application of the memory capability of the present invention is targeted marketing of subscribers. In this application, the interactive program box processor compiles and stores information including the interactive program box number associated with the subscriber, time and date of the program viewing, the list of subscriber selections made by the subscriber during the program, and the program ID (contained in the program codes broadcast with the program). This data is preferably stored together in data packets. From this data, a data code can be generated which provides an overall profile of the subscribers purchasing desires. This data code can either be sent via modem and over telephone lines to a retail location or displayed or printed out at the subscriber home. This code can then be used by the retail stores to offer unique purchasing price reductions and other options to the subscribers.

While in the preferred embodiment, the system has been described as a simulcast system whereby both an interactive program and a noninteractive program are broadcast to subscribers, the system does not require the program to be noninteractive. In other words, the system is not limited to providing the dual functional programs but can simply provide interactive programming, not receivable without the interactive program boxes 600, using the same elements described above.

The above systems of the present invention can be combined with those described in earlier Freeman U.S. Pat. Nos. 4,847,700, 4,507,680, 4,573,072, 4,602,279, 4,364,925, and 4,264,924 and in commonly copending U.S. patent application Ser. No. 07/797,298, filed Nov. 25, 1991, resulting with home viewers equipped with a more sophisticated decoder box to receive more enhanced interactivity such as instant replay, targeted advertising, etc., through second or third transmitted video signals, all of which can be provided with the personalized audio and graphics in the manner described above.

Using the foregoing embodiments, methods and processes, the ACTV simulcast system maximizes personalized attention and interactivity to subscribers in their homes in real time using a low cost interactive system. Although the present invention has been described in detail with respect to certain embodiments and examples, variations and modifications exist which are within the scope of the present invention as defined in the following claims.

We claim:

1. A fully interactive system for receiving an interactive program signal simulcasting an interactive program and a conventional television program, both programs provided with one conventional television video signal, to multiple subscriber locations permitting authorized interactive subscribers to interact with and receive different and personalized responses from the interactive program and noninteractive subscribers to view and listen to a conventional television program, the system comprising:

at least one means for receiving the interactive program signal, wherein the interactive program signal contains a plurality of audio channels, graphics data, control data, a standard video signal and standard audio signal, wherein the control data contains branching codes and trigger points, and whereby the branching codes provide for the linking of one or more audio segments to form a complete and personalized message;

at least one means for displaying the standard video signal, at least one interactive program means, connected to the receiving means and display means, for permitting authorized interactive subscribers to interact with and receive different personalized responses, comprising:

a means for demodulating the standard video and standard audio signal;

means for extracting, connected to the demodulating means, the plurality of audio channels and graphics and control data from the interactive program signal, wherein each audio channel comprises one or more audio segments;

means for storing the graphics and control data, wherein the graphics comprises graphics codes designating at least one interrogatory message;

means for gathering at least one subscriber entry;

program selection means, operably connected to the storage means and extracting means, for reading the control data, controlling operation of the interactive program means, and selecting a personalized response at predetermined trigger points, whereby the trigger point initiates the selection of the personalized response corresponding to an interactive event for presentation to the subscriber, comprising:

means for selecting one or more audio segments or graphics messages to form a personalized audio or graphics response, whereby the subscriber entry and branching codes are used in each branch in formulating the personalized audio or graphics response;

a graphics generator, connected to the program selection means, for presenting graphics messages on the display means; and means for interactively presenting the standard video and standard audio and the personalized audio or graphics response to the interactive subscribers so that interactive subscribers fully interact with the program to alter program content and interact uniquely and differently from other interactive subscribers to receive personalized responses while noninteractive subscribers continue to receive a conventional television program.

2. The fully interactive system of claim 1 wherein the plurality of audio channels, standard video signal and standard audio signal, and graphics and control data of the interactive program signal are analog and embedded in a standard NTSC video signal and the extracting means comprises means for removing the plurality of audio channels and graphics and control data from the standard NTSC video signal.

3. The fully interactive system of claim 1 wherein the plurality of audio channels, standard video signal and standard audio signal, and graphics and control data are digitally encoded and combined in a composite digital interactive signal and the receiving means further comprises:

means for demultiplexing the plurality of audio channels, standard video signal and standard audio signal, and data from the composite digital interactive signal.

4. The fully interactive system of claim 1 wherein the interactive program is a recorded program to be received at a later time.

5. The fully interactive system of claim 1 wherein the program selection means directs the storage means to store one or more previous subscriber entries and wherein the program selection means comprises means for processing the previous subscriber entries along with the current subscriber entry so that a selection is based on prior subscriber entries, the current subscriber entry and the codes in formulating the personalized audio or graphics response.

6. The fully interactive system of claim 1 wherein the program selection means directs the storage means to store one or more previous subscriber entries and wherein the program selection means comprises means for processing the previous subscriber entries along with the current subscriber entry for determining the next graphics message to overlay onto the video signal.

7. The fully interactive system of claim 1 wherein the means for gathering a subscriber entry comprises:

a remote controller, comprising:
  means for entering subscriber entry;
  means for preparing a return signal to represent the subscriber entry; and
  means for transmitting the subscriber entry to the interactive program box.

8. The fully interactive system of claim 1 wherein each channel of the plurality of channels comprises a sequence of audio response segments separated in time, with each audio response segment concurrent with audio segments in other channels thereby forming an array of audio response segments and the program selection means comprises means for picking an audio response segment from the entire array of audio response segments so that the quantity of the selectable personalized audio response segments is greater than the quantity of the plurality of audio channels.

9. An interactive program production system used for creating a single composite interactive signal to multiple subscribers, the composite interactive signal simulcasting both a conventional television program and a fully interactive program, both programs provided in a conventional television bandwidth to multiple subscribers, comprising:

means for creating a conventional video signal comprising a standard audio and standard video;

means for generating graphics data, the data being used for identifying graphics characters that are to be overlaid on the video at predetermined points in time;

means for providing a plurality of audio channels, the audio channels comprising audio segments, the audio segments being of substantially equal length in time and related in content to each other;

means for creating control data comprising codes, whereby the codes are used for initiating, controlling, and branching between the plurality of audio channels at predetermined trigger points, whereby the trigger point initiates the selection of a personalized response corresponding to an interactive event for presentation to the subscriber;

means for combining the conventional video signal, control data and plurality of audio channels into a single composite interactive signal; and means for transmitting the single composite interactive signal to multiple subscribers.

10. The interactive program production system of claim 9, the unit further comprising:

means for digitally encoding the conventional video signal and plurality of audio channels; and means for multiplexing the control and graphics data, the plurality of audio channels and the conventional video signal into a single composite digital interactive signal.

11. The interactive program production system of claim 9 wherein the conventional video signal, graphics and control data and plurality of audio channels are analog and the combining means comprises means for embedding the graphics and control data, and plurality of audio channels into the conventional video signal.

12. The interactive program production system of claim 9 wherein the conventional video signal comprises a vertical blanking interval and the embedding means comprises means for inserting the graphics and control data and plurality of audio channels into the vertical blanking interval of the conventional video signal.

13. The interactive program production system of claim 9 wherein the transmission means comprises a television broadcasting means.

14. The interactive program production system of claim 9 wherein the transmission means comprises a cable means.

15. The interactive program production system of claim 9 wherein the transmission means comprises a satellite broadcast means.

16. The interactive program production system of claim 9 wherein the means for providing a plurality of audio channels comprises a means for linking a sequence of audio response segments in each channel forming an array of stacked audio segments so that the quantity of selectable audio response segments is greater than the quantity of the plurality of audio channels.

17. The interactive program production system of claim 9 further comprising a means for recording the composite interactive signal for later transmission.

18. The interactive program production system of claim 9 wherein the composite interactive signal comprises a live program.

19. An interactive program production system used for creating a single composite interactive signal to multiple subscribers, the composite interactive signal simulcasting both a conventional television program and a fully interactive program, both programs provided in a conventional television bandwidth to multiple subscribers, comprising:

means for creating a conventional video signal comprising a standard audio and standard video;

means for generating graphics data, the data being used for identifying graphics characters that are to be overlaid on the video at predetermined points in time including means for generating a first graphic interrogatory question to overlay the conventional video signal if the fully interactive program is being simulcast;

means for providing a plurality of graphic channels, the graphic channels comprising graphic segments responsive to the first graphic interrogatory, the graphic segments being of substantially equal length in time and related in content to each other;

means for creating control data comprising codes, whereby the codes are used for initiating, controlling, and branching between a plurality of audio channels and the graphic channels at predetermined trigger points, whereby the trigger point initiates the selection of a personalized response corresponding to an interactive event for presentation to the subscriber;

means for combining the conventional video signal, control data and plurality of graphic channels into a single composite interactive signal; and means for transmitting the single composite interactive signal to multiple subscribers.

20. The interactive program production system of Claim 19 wherein the system is used to simulcast a sporting event in a conventional and an interactive format, the means for generating a first graphic interrogatory being used to enable selection by an interactive subscriber of statistics for a particular player or team and the means for generating a plurality of graphic channels being used to provide the statistics selected in response to the interrogatory question.

21. The interactive program production system of claim 19 further comprising means for providing a plurality of audio channels, the audio channels comprising audio segments related in time and content to the plurality of graphic channels, the audio segments being of substantially equal length in time and related in content to each other; and wherein the combining means comprises means for combining the conventional video signal, control data and plurality of audio and graphic channels into a single composite interactive signal.

22. An interactive program production system used for creating a single composite interactive signal to multiple subscribers, the composite interactive signal simulcasting both a conventional television program and a fully interactive program, both programs provided in a conventional television bandwidth, to multiple subscribers, comprising:

means for creating a conventional video signal comprising a standard audio and standard video;

means for generating graphics data, the data being used for identifying graphics characters that are to be overlaid on the video at predetermined points in time including means for generating a first graphic interrogatory question to overlay the conventional video signal if the fully interactive program is being simulcast;

means for providing a plurality of graphic channels, the graphic channels comprising graphic segments responsive to the first graphic interrogatory, the graphic segments being of substantially equal length in time and related in content to each other;

means for providing a plurality of audio channels, the audio channels comprising audio segments related in time and content to the plurality of graphic channels, the audio segments being of substantially equal length in time and related in content to each other;

means for creating control data comprising codes, whereby the codes are used for initiating, controlling, and branching between the plurality of audio and graphic channels at predetermined trigger points, whereby the trigger point initiates the selection of an audio segment corresponding to an interactive event for presentation to the subscriber;

means for combining the conventional video signal, control data and plurality of audio and graphic channels into a single composite interactive signal; and means for transmitting the single composite interactive signal to multiple subscribers.

23. The interactive program production system of claim 22 wherein the system is used to simulcast a sporting event in a conventional and an interactive format, the means for generating a first graphic interrogatory being used to enable selection by an interactive subscriber of statistics for a particular player or team; the means for generating a plurality of graphic channels being used to provide the statistics selected in response to the interrogatory question; and the means for providing a plurality of audio channels being used to provide a voice response reading or commenting on the statistics chosen which can be the voice of the player or owner of the team whose statistics were requested in the response to the interrogatory question.

24. An interactive program production system used for creating a single composite interactive signal to multiple subscribers, the composite interactive signal simulcasting both a conventional television program and a fully interactive program, both programs provided in a conventional television bandwidth to multiple subscribers, comprising:

means for creating a conventional video signal, wherein the conventional video signal contains standard audio and standard video;

means for generating graphics data, the data being used for identifying graphics characters that are to be overlaid on the video at predetermined points in time;

means for providing a plurality of interactive video channels, the video channels comprising video segments, the video segments being of substantially equal length in time and related in content to each other;

means for creating control data comprising codes, whereby the codes are used for initiating, controlling, and branching between the plurality of interactive video channels at predetermined trigger points, whereby the trigger point initiates the selection of a personalized response corresponding to an interactive event for presentation to the subscriber;

means for combining the conventional video signal, control data and plurality of interactive video channels into a single composite interactive signal; and means for transmitting the single composite interactive signal to multiple subscribers, each of the subscribers having a means to receive the conventional video signal and at least one of the subscribers having means to receive the interactive video signal with the ability to switch between the plurality of video channels.

25. The interactive program production system of claim 24 wherein the system is used to simulcast a sporting event in a conventional and an interactive format, wherein the means for generating graphics data includes means for generating a first graphic interrogatory question to overlay the conventional video signal if the fully interactive program is being simulcast to enable selection by an interactive subscriber of different angles of play, a close-up of a particular player or team or a replay of the last play and the means for generating a plurality of interactive video channels is used to provide the video channel which displays the selection selected in response to the interrogatory question.

26. A method for offering a single composite interactive program signal for simulcasting an interactive program and a conventional program both within a conventional television bandwidth to multiple subscriber homes, the method comprising the steps of:

packaging the single composite interactive program signal, wherein the packaged composite interactive program signal contains a plurality of audio channels, graphics data and control data and a standard video signal and standard audio signal, and wherein the control data contains branching codes which include trigger points, the trigger points defining the moments during the presentation of the program when an interactive response is presented to the subscribers;

transmitting the single composite interactive program signal to at least one receive site location;

receiving the single composite interactive program signal;

extracting the audio channels, graphics data and control data from the single composite interactive program signal;

storing the graphics data and control data;

generating graphics characters, the graphics characters comprising at least one interrogatory message;

overlaying the graphics characters onto portions of the standard video signal to obtain a resulting video signal;

displaying the resulting video signal on a display monitor;

gathering a subscriber entry to the graphics interrogatory message;

branching between the plurality of audio channels to form a personalized audio response, whereby the subscriber entry and branching codes are used in formulating the personalized audio response with the branching algorithm providing a more individualized response by storing each subscriber entry in memory and personalizing the audio response based on a plurality of subscriber responses;

presenting the personalized response to the subscriber at the trigger points, whereby each subscriber interacts with the interactive program individually and differently from other subscribers, with each subscriber receiving a unique personalized audio response.

27. An interactive home entertainment and educational system for receiving a fully interactive program signal, the fully interactive program signal transmitted in a single standard television broadcast bandwidth, the system comprising:

at least one means for receiving the interactive program signal, wherein the interactive program signal contains a plurality of audio channels comprising audio segments, control data and a video signal, and wherein the interactive program signal is carried in a single standard television broadcast bandwidth, wherein the control data contains branching codes and trigger points, and whereby the branching codes provide for the linking of one or more audio segments to form a complete and personalized message;

at least one means for displaying the video signal;

at least one interactive program box, connected to the receiving and display means, for permitting authorized interactive subscribers to interact with and receive different personalized responses, comprising:

means for extracting, connected to the receiving means, the plurality of audio channels and data;

means for storing a plurality of graphics interrogatory messages;

means for gathering a subscriber entry;

a program selection means, connected to the extracting means and storage means, for selecting personalized graphics interrogatory messages from the plurality of graphics interrogatory messages and an audio response, comprising at least one personalized audio segment from the plurality of audio channels, both selections occurring at predetermined trigger points, whereby the trigger point initiates the selection of an audio segment corresponding to an interactive event for presentation to the subscriber comprising:

means for processing previous subscriber entries along with the current subscriber entry for determining a graphics interrogatory message;

means for formulating a personalized audio response comprising at least one audio segment, wherein the audio response is chosen as a function of a most current subscriber entry and at least one previous subscriber entry;

a graphics generator, connected to the program selection means, for overlaying the selected graphics interrogatory message onto the video signal; and a means for presenting the personalized audio response to the subscribers thereby allowing each subscriber to fully interact uniquely and differently from other subscribers at other subscriber locations.

28. The interactive home entertainment and educational system of claim 27 wherein the plurality of audio channels, video signal, and data of the interactive program signal are analog and embedded in a standard NTSC video signal and the extracting means comprises means for removing the plurality of audio channels and graphics and control data from the standard NTSC video signal.

29. The interactive home entertainment and educational system of claim 27 wherein the plurality of audio channels, video signal, and data are digitally encoded and combined in a composite digital interactive signal and the receiving means further comprises:

means for demultiplexing the plurality of audio channels, video signal and data from the composite digital interactive signal; and means for converting the demultiplexed audio channels and the demultiplexed video signal into analog signal.

30. The interactive home entertainment and educational system of claim 27 wherein each channel of the plurality of audio channels comprises a sequence of audio response segments separated in time, with each audio response segment concurrent with audio segments in other channels thereby forming an array of audio response segments and the program selection means comprises means for picking an audio response segment from the entire array of audio response segments so that the quantity of the selectable personalized audio response segments is greater than the quantity of the plurality of audio channels.

* * * * *

UNITED STATES PATENT AND TRADEMARK OFFICE
CERTIFICATE OF CORRECTION

PATENT NO. : 5,585,858
DATED : Dec. 17, 1996
INVENTOR(S) : Harper et al.

It is certified that error appears in the above-indentified patent and that said Letters Patent is hereby corrected as shown below:

| | |
|---|---|
| Col. 1, line 7 | "08/798,355" should be --08/228,355-- |
| Col. 10, line 11 | "Gent-lock" should be --Gen-Lock-- |
| Col. 20, line 4 | "FLFO" should be --FIFO-- |
| Col. 20, line 19 | "Inserted" should be --inserted-- |
| Col. 22, line 18 | "A.PC" should be --APC-- |
| Col. 32, line 52 | "analog signal" should be --analog signals-- |

Signed and Sealed this

Eighteenth Day of November 1997

Attest:

BRUCE LEHMAN

*Attesting Officer*    Commissioner of Patents and Trademarks